United States Patent
Cavendish et al.

(10) Patent No.: US 11,595,801 B2
(45) Date of Patent: Feb. 28, 2023

(54) SYSTEMS AND METHODS FOR EMERGENCY DATA COMMUNICATION

(71) Applicant: QUALCOMM Incorporated, San Diego, CA (US)

(72) Inventors: Dirceu Cavendish, San Diego, CA (US); Ashok Bhatia, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/186,827

(22) Filed: Nov. 12, 2018

(65) Prior Publication Data

US 2019/0082315 A1 Mar. 14, 2019

Related U.S. Application Data

(63) Continuation of application No. 15/078,799, filed on Mar. 23, 2016, now Pat. No. 10,142,816.
(Continued)

(51) Int. Cl.
*H04W 4/90* (2018.01)
*H04W 4/02* (2018.01)
(Continued)

(52) U.S. Cl.
CPC ............ *H04W 4/90* (2018.02); *H04W 4/021* (2013.01); *H04W 4/025* (2013.01); *H04W 4/06* (2013.01);
(Continued)

(58) Field of Classification Search
CPC ........... H04W 4/90; H04W 4/70; H04W 4/06; H04W 4/025; H04W 4/50; H04W 4/33;
(Continued)

(56) References Cited

U.S. PATENT DOCUMENTS 7,359,716 B2 * 4/2008 Rowitch ............... H04W 64/00
455/456.3
8,538,374 B1 9/2013 Haimo et al.
(Continued)

FOREIGN PATENT DOCUMENTS

| CN | 103002425 A | 3/2013 |
|---|---|---|
| CN | 103373304 A | 10/2013 |
| CN | 104112247 A | 10/2014 |

OTHER PUBLICATIONS

International Search Report and Written Opinion—PCT/US2016/059925—ISA/EPO—dated Feb. 8, 2017.

*Primary Examiner* — Marcos L Torres
(74) *Attorney, Agent, or Firm* — Sunstein LLP

(57) ABSTRACT

Disclosed are methods, systems, devices, servers, apparatus, computer-/processor-readable media, and other implementations, including a method that includes receiving by a device a triggering message from an emergency call server responsive to an indication at an emergency condition at the device to trigger a tracking session to periodically collect and send tracking session data associated with the device to one or more servers, establishing the tracking session, separate from an emergency call session established between the device and the emergency call server, with the one or more servers, and sending, by the device to the one or more servers, the tracking session data collected during the tracking session by the device.

22 Claims, 12 Drawing Sheets

Related U.S. Application Data

(60) Provisional application No. 62/268,241, filed on Dec. 16, 2015.

(51) Int. Cl.

| | | |
|---|---|---|
| *H04W 24/08* | (2009.01) | |
| *H04W 4/06* | (2009.01) | |
| *H04W 4/021* | (2018.01) | |
| *H04W 52/02* | (2009.01) | |
| *H04W 4/50* | (2018.01) | |
| *H04W 4/70* | (2018.01) | |
| *H04W 4/33* | (2018.01) | |
| *H04W 4/38* | (2018.01) | |

(52) U.S. Cl.
CPC ............... *H04W 4/33* (2018.02); *H04W 4/50* (2018.02); *H04W 4/70* (2018.02); *H04W 24/08* (2013.01); *H04W 52/0229* (2013.01); *H04W 52/0261* (2013.01); *H04W 4/38* (2018.02); *Y02D 30/70* (2020.08)

(58) Field of Classification Search
CPC ... H04W 4/38; H04W 24/08; H04W 52/0229; H04W 52/0261; Y02D 70/146; Y02D 70/122; Y02D 70/1262; Y02D 70/166; Y02D 70/142; Y02D 70/144; Y02D 70/26; Y02D 70/164; Y02D 70/162; Y02D 70/1242
See application file for complete search history.

(56) References Cited

U.S. PATENT DOCUMENTS

| | | |
|---|---|---|
| 8,937,554 B2 | 1/2015 | Kwan et al. |
| 9,020,690 B2 | 4/2015 | McKown et al. |
| 9,183,731 B1 | 11/2015 | Bokhary |
| 10,142,816 B2 | 11/2018 | Cavendish et al. |
| 2003/0144042 A1 | 7/2003 | Weinfield et al. |
| 2008/0139169 A1* | 6/2008 | Fujimoto ............... H04W 76/50 455/404.2 |
| 2009/0149153 A1 | 6/2009 | Lee |
| 2010/0210282 A1 | 8/2010 | Ventulett et al. |
| 2012/0115430 A1 | 5/2012 | Hawkes et al. |
| 2012/0171983 A1 | 7/2012 | Eitel et al. |
| 2012/0178411 A1 | 7/2012 | Li et al. |
| 2013/0109343 A1 | 5/2013 | Cheng et al. |
| 2013/0324154 A1 | 12/2013 | Raghupathy et al. |
| 2014/0119544 A1 | 5/2014 | Lee |
| 2015/0111524 A1* | 4/2015 | South ................... G08B 27/001 455/404.2 |
| 2015/0189485 A1 | 7/2015 | Levin et al. |
| 2015/0213708 A1* | 7/2015 | Barzangi ............... G08B 25/016 455/404.2 |
| 2015/0365796 A1 | 12/2015 | Toni |
| 2016/0057570 A1* | 2/2016 | Lin ........................ H04W 4/90 455/404.2 |
| 2016/0234645 A1 | 8/2016 | Belghoul et al. |
| 2016/0337831 A1 | 11/2016 | Piett et al. |
| 2017/0019777 A1* | 1/2017 | Cole, Jr. ............... H04W 4/029 |
| 2017/0180929 A1 | 6/2017 | Cavendish et al. |
| 2019/0090088 A1 | 3/2019 | Cavendish et al. |
| 2020/0145809 A1 | 5/2020 | Cavendish et al. |

\* cited by examiner under the page layout.

SYSTEMS AND METHODS FOR EMERGENCY DATA COMMUNICATION

CROSS-REFERENCE TO RELATED APPLICATIONS

This application is a continuation of application Ser. No. 15/078,799, filed Mar. 23, 2016, entitled "SYSTEMS AND METHODS FOR EMERGENCY DATA COMMUNICATION," which claims the benefit of U.S. Provisional Application No. 62/268,241, filed Dec. 16, 2015, entitled "SYSTEMS AND METHODS FOR EMERGENCY DATA COMMUNICATION," each of which is hereby incorporated herein by reference for all purposes.

BACKGROUND

Emergency support systems (e.g., to handle 911 calls, road-side problems, etc.) generally operate on the assumption of a single-shot position. Thus, particulars regarding an emergency call (e.g., the nature of the emergency, location where the emergency situation is taking place, with that location either derived based on data included with the received call or through a live conversation between a user and an operator) are generally provided during the emergency call session only. However, additional information that becomes available after the emergency call has ended may not be provided to the emergency call server or to the specific emergency service providers that are dispatched to handle the emergency.

SUMMARY

In some variations, a method is provided that includes receiving by a device a triggering message from an emergency call server responsive to an indication of an emergency condition at the device to trigger a tracking session to periodically collect and send tracking session data associated with the device to one or more servers, establishing the tracking session, separate from an emergency call session established between the device and the emergency call server, with the one or more servers, and sending, by the device to the one or more servers, the tracking session data collected during the tracking session by the device.

In some variations, a wireless device is provided that includes a transceiver configured to receive a triggering message from an emergency call server responsive to an indication of an emergency condition at the wireless device to trigger a tracking session to periodically collect and send tracking session data associated with the wireless device to one or more servers. The wireless device further includes one or more processors, coupled to the transceiver, configured to establish the tracking session, separate from an emergency call session established between the wireless device and the emergency call server, with the one or more servers. The transceiver is further configured to send, to the one or more servers, the tracking session data collected during the tracking session by the wireless device.

In some variations, an apparatus is provided that includes means for receiving a triggering message from an emergency call server responsive to an indication of an emergency condition at a device to trigger a tracking session to periodically collect and send tracking session data associated with the device to one or more servers, means for establishing the tracking session, separate from an emergency call session established between the device and the emergency call server, with the one or more servers, and means for collecting and sending, by the device to the one or more servers, the tracking session data collected during the tracking session by the device.

In some variations, a non-transitory computer readable media is provided that is programmed with instructions, executable on a processor, to receive a triggering message from an emergency call server responsive to an indication of an emergency condition at the device to trigger a tracking session to periodically collect and send tracking session data associated with the device to one or more servers, establish the tracking session, separate from an emergency call session established between the device and the emergency call server, with the one or more servers, and send, by the device to the one or more servers, the tracking session data collected during the tracking session by the device.

Other and further objects, features, aspects, and advantages of the present disclosure will become better understood with the following detailed description of the accompanying drawings.

BRIEF DESCRIPTION OF THE DRAWINGS

Like reference symbols in the various drawings indicate like elements.

DETAILED DESCRIPTION

Figure 1:
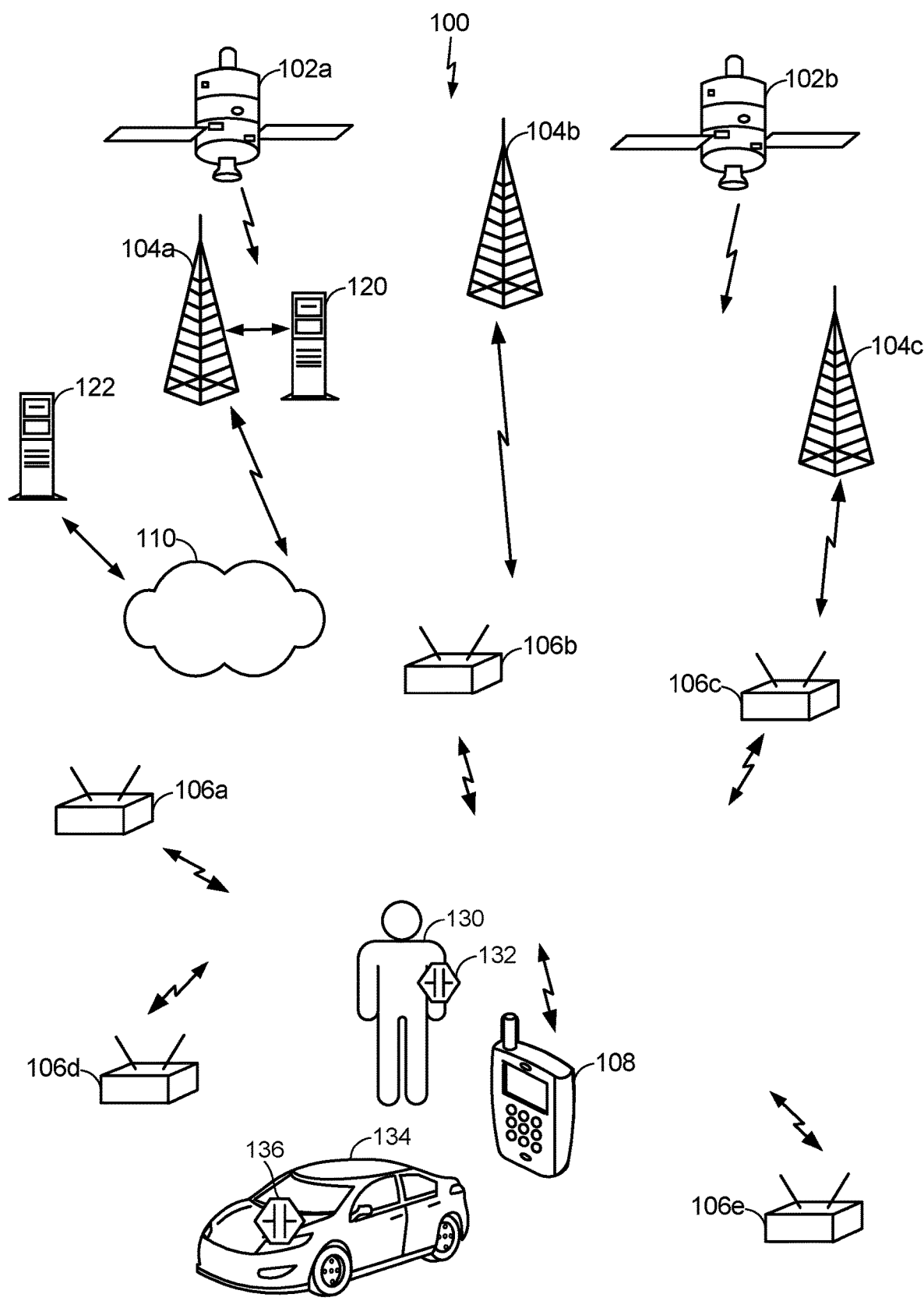
FIG. 1 is a diagram of an example operating environment to support emergency data communication.

Described herein are methods, systems, devices, apparatus, computer-/processor-readable media, and other implementations for emergency data collection and communication. In some embodiments, a method is provided that includes receiving by a device (e.g., a mobile device, or any other type of device) a triggering message from an emergency call server responsive to an indication of an emergency condition (e.g., an E-911 message, an eCall message, etc.) at the device to trigger a tracking session to periodically collect and send tracking session data (also referred to as emergency data or e-metadata) associated with the device to one or more servers (e.g., one or more emergency tracking servers), establishing the tracking session, separate from an emergency call session between the device and the emergency call server, with the one or more servers, and sending, by the device to the one or more servers, the tracking session data collected during the tracking session by the device. In some embodiments, the device receiving the triggering message may have initiated the emergency call session by, for example, sending the indication of the emergency condition, while in some situations, the indication of the emergency condition may have been sent in response to an initial message (e.g., broadcast message) from the emergency call server, or the indication of the emergency condition may have been sent by another device (e.g., operated by a third-party reporting the emergency that involved the party associated with the device receiving the triggering message). In some embodiments, the method may further include placing the device in a reduced-power tracking mode state, in response to receiving the triggering message to establish the separate tracking session, including reducing power provided to sub-systems of the device not required to collect or communicate the tracking session data associated with the device, and providing at least partial power to one or more sensor or communication sub-systems of the device to cause the one or more sensor or communication sub-systems to operate at least partially while the device is in the reduced-power tracking mode state to communicate to the one or more servers at least some of the tracking session data. In some embodiments, sending the tracking session data may include determining at a first time instance one or more subsequent wake-up times to transmit data to the one or more servers, with the one or more wake-up times determined based on, for example, charge level of a battery of the device, time elapsed since the emergency message with e-metadata was last communicated, a maximum periodicity for communicating by the device the tracking data, and/or other factors.

Also described herein are systems, methods, devices, and other implementations, including a method that includes receiving by an emergency call server an indication of an emergency condition at a device, determining whether the device is to be tracked based, at least in part, on the indication of the emergency condition, and transmitting a triggering message from the emergency call server, in response to a determination that the device is to be tracked, to trigger at the device a tracking session to cause the device to periodically collect and send tracking session data to one or more servers. The tracking session, established between the device and the one or more servers, is separate (e.g., different and/or independent) from an emergency call session established between the device and the emergency call server. As noted, the indication of the emergency condition may have been sent directly by the device (either at the initiative of the device or in response to a polling message, such as a broadcast message from the emergency call server), or the indication of the emergency condition may have been received from some other device (e.g., a mobile device operated by a third-party reporting an emergency involving the user of the device that receives the triggering message). In some embodiments, the triggering message transmitted to the device is further configured to cause the device to operate in a reduced-power tracking mode state in which power to sub-systems of the device not required for collecting and communicating tracking session data associated with the mobile device is reduced, and in which one or more sensor or communication sub-systems of the device, configured to perform communication of the tracking session data, operate at least partially while the device is in the reduced-power tracking mode state.

The implementations described herein may also include a method that includes receiving by at least one server (e.g., an emergency tracking server), from a device (e.g., a mobile device), a request to establish a tracking session to periodically collect and send tracking session data to the at least one server relating to an emergency condition at the device, the request to establish the tracking session sent by the device in response to a triggering message from an emergency call server to trigger the tracking session. The triggering message is transmitted from the emergency call server to the device during an emergency call session, separate from the tracking session, in response to an indication message of the emergency condition at the device transmitted to the emergency call server. The method further includes sending by the at least one server a reply to the device to establish the tracking session, and periodically receiving by the at least one server, from the device, the tracking session data collected by the device during the tracking session. In some embodiments, the indication message of the emergency condition at the device transmitted to the emergency call server includes one of, for example, an initiating message from the device regarding the emergency condition, a reply message from the device responsive to a polling message from the emergency call server, or a reporting message from another device to report the emergency condition at the device. In some embodiments, the at least one server may be configured to modify the characteristics of the tracking session by, for example, sending commands to the device in order to change its data collection behavior, including, but not limited to, emergency data type, frequency (pace) of collection, amount of data, identity of the at least one server to receive tracking data, etc. In some embodiments, modification of the tracking session may also include terminating the communication links between the at least one server and the device.

The methods, systems, devices, and other implementations described herein can therefore provide device tracking-session data at low power consumption mode (sufficient to support tracking-session/emergency data collection for the device and the communication of the data to a remote server, but with other device sub-systems turned off, or their power consumption and corresponding functionality reduced, to thus facilitate emergency service delivery (e.g., by a fire-fighting squad, a police force, a medical rescue team, etc.) In some embodiments, tracking data collection may continue uninterrupted even if device is turned off by device user (i.e., locking the device into tracking mode).

Thus, with reference to FIG. 1, a diagram of an example operating environment 100 that includes a device 108, which may be a wireless device (mobile or stationary), or a communication sub-system (e.g., unit mounted on a vehicle, train, airplane, etc.), configured to initiate an emergency call and provide periodic tracking-session data thereafter, that in communication with one or more devices/nodes/servers, is shown. The device 108 may be configured to communicate according to one or more communication protocols (e.g., near-field protocols, such as Bluetooth® wireless technology, or Zigbit, WLAN protocols, such as a WiFi protocol according to IEEE 802.11k standard, WWAN protocols, etc.) As will be discussed in greater details below, the device 108 may be configured, in some embodiments, to send/ communicate (at the initiative of the device 108, or in response to a message, such as a polling broadcast message received by the device 108) to an emergency call server (such as an emergency call server 120, which may be a public safety answering point, or PSAP, server) an indication of an emergency condition (e.g., an E-911 message to report a medical emergency, a roadside emergency, an emergency reported with respect to some third-party, etc.), and to receive a triggering message from the emergency call server responsive to the indication of the emergency condition to trigger a tracking session to periodically collect and send tracking session data associated with the mobile device to one or more servers (such as an emergency tracking server 122, which may be different from the server 120 to which the emergency indication message was communicated). In some embodiments, the triggering message may have been received as a result of an indication message sent from some other device, associated with a third-party, to report the emergency condition associated with the device. The tracking session data may be collected from sensors associated with the device 108, including sensors housed within the device (e.g., inertial sensors, transceivers, etc., as will be more particularly described below), and sensors located remotely from the device. The remote sensors may be biometric sensors (such as a sensor 132 worn by a user 130), vehicle-based sensors (such as a sensor 136, e.g., an oil-pressure sensor, located at a vehicle 134), etc. Remote sensors may communicate with the device 108 via one or more near-field communication links (e.g., Bluetooth® wireless technology links), via LAN-based communication links, etc. The device 108, which establishes a tracking session with the one or more servers that is separate from the emergency call session, is configured to send the tracking session data collected during the tracking session to the one or more tracking servers. The device 108 may also be configured to reduce power (and thus enter a reduced-power tracking mode state) provided to sub-systems of the device not required to collect and/or communicate the tracking session data associated with the device (e.g., sub-systems such as the video sub-system, the application processor sub-system which supports applications such as the e-mail application, third-party applications, etc.), and to provide at least partial power to one or more sensor or communication sub-systems of the mobile device to cause the one or more sensor or communication sub-systems to operate at least partially while the device is in the reduced-power tracking mode state in order to communicate to the one or more servers (e.g., the tracking servers) at least some of the tracking session data. Thus, upon being triggered to start a tracking session (e.g., in response to receiving a triggering message or request from the emergency call server to commence a tracking session), the device is configured to invoke emergency power settings (to operate at reduced power levels in order to preserve the power source of the device) and periodically communicate tracking session data (also referred to as emergency data, or metadata), the device 108 is configured to collect during the tracking session. The session tracking data provides updates about possible changes to the position of the device, updates regarding the medical condition of the user (where the emergency is a medical emergency) as may be provided by biometric sensors (e.g., located remotely on user-wearable devices), and to otherwise provide germane data to one or more emergency service providers to facilitate an expeditious provision of emergency care. In some embodiments, real-time processing may be performed on the tracking data provided to the one or more servers to obtain real-time processing (e.g., filtering irrelevant data, aggregating vital signs into a patient status data set, delivering processed data to emergency service squad, etc.) Additionally, off-line processing may be performed on the tracking session data, e.g., to derive emergency resolution statistics, perform insurance risk analysis, etc.

The device 108 (as well as any other device depicted in FIG. 1) may be configured to operate and interact with multiple types of other communication systems/devices, including local area network devices (or nodes), such as WLAN for indoor communication, femtocells, Bluetooth® wireless technology-based transceivers, and other types of indoor communication network nodes, wide area wireless network nodes, satellite communication systems, other mobile devices, etc., and as such the device 108 may include one or more interfaces and/or transceivers to communicate with the various types of communications systems. The various devices of FIG. 1 may be configured to establish and operate according to any number of communication protocols.

As noted, the environment 100 may contain one or more different types of wireless and/or wired communication systems or nodes, each of which may be used to establish communication links between the device 108, the emergency call server 120, and/or the emergency service provider tracking server 122 depicted in FIG. 1. The nodes illustrated in FIG. 1 include wireless access points (or WAPs) and may include LAN and/or WAN wireless transceivers, including, for example, WiFi base stations, femto cell transceivers, Bluetooth® wireless technology transceivers, cellular base stations, WiMax transceivers, etc. Thus, for example, and with continued reference to FIG. 1, the environment 100 may include the Local Area Network Wireless Access Points (LAN-WAPs) 106*a-e* that may be used for wireless voice and/or data communication with the device 108. The LAN-WAPs 106*a-e* may also be utilized, in some embodiments, as independent sources of position data, e.g., through fingerprinting-based procedures, through implementation of multilateration-based procedures based, for example, on timing-based techniques (e.g., RTT-based measurements), signal strength measurements (e.g., RSSI measurements), etc., which then may be included as emergency tracking data sent by the mobile device 108. The LAN-WAPs 106*a-e* can be part of a Wireless Local Area Network (WLAN), which may operate in buildings and perform communications over smaller geographic regions than a WWAN. Additionally in some embodiments, the LAN-WAPs 106*a-e* could also include pico or femto cells. In some embodiments, the LAN-WAPs 106*a-e* may be part of, for example, WiFi networks (802.11x), cellular piconets and/or femtocells, Bluetooth® wireless technology Networks, etc. Although five (5) LAN-WAP access points are depicted in FIG. 1, any number of such LAN-WAP's may be used, and, in some embodiments, the environment 100 may include no LAN-WAPs access points at all, or may include a single LAN-WAP access point.

As further illustrated, the environment 100 may also include a plurality of one or more types of the Wide Area Network Wireless Access Points (WAN-WAPs) 104*a-c*, which may be used for wireless voice and/or data communication, and may also serve as another source of independent information through which the wireless device 108 (and/or other devices) may determine its position/location (which may then be transmitted as part of emergency tracking data). The WAN-WAPs 104*a-c* may be part of wide area wireless network (WWAN), which may include cellular base stations, and/or other wide area wireless systems, such as, for example, WiMAX (e.g., 802.16). A WWAN may include other known network components which are not shown in FIG. 1. Typically, each WAN-WAPs 104a-c within the WWAN may operate from fixed positions or may be moveable, and may provide network coverage over large metropolitan and/or regional areas. Although three (3) WAN-WAPs are depicted in FIG. 1, any number of such WAN-WAPs may be used. In some embodiments, the environment 100 may include no WAN-WAPs at all, or may include a single WAN-WAP.

Communication to and from the device 108 (to exchange data, including messages indicating an emergency condition and messages including emergency data, and provide location determination operations and services to the device 108, etc.) may be implemented using various wireless communication networks and/or technologies and/or encodings, such as a wide area wireless network (WWAN), a wireless local area network (WLAN), a wireless personal area network (WPAN), a peer-to-peer network, and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other radio access technology (RAT). GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. In some embodiments, 4G networks, Long Term Evolution ("LTE") networks, Advanced LTE networks, Ultra Mobile Broadband (UMB) networks, and all other types of cellular communications networks may also be implemented and used with the systems, devices methods, and other implementations described herein. A WLAN may also be implemented, at least in part, using an IEEE 802.11x network, and a WPAN may be a Bluetooth® wireless technology network, an IEEE 802.15x, or some other type of network. The techniques described herein may also be used for any combination of WWAN, WLAN and/or WPAN.

In some embodiments, and as further depicted in FIG. 1, the device 108 may also be configured to at least receive information from a Satellite Positioning System (SPS) 102a-b, which may be used as an independent source of position information for the device 108. The device 108 may thus include one or more dedicated SPS receivers configured to receive signals for deriving device geo-location information from the SPS satellites (which may be transmitted as part of emergency tracking data). In embodiments in which the device 108 can receive satellite signals, the mobile device may utilize a receiver (e.g., a GNSS receiver) specifically implemented for use with the SPS to extract position data from a plurality of signals transmitted by at least the SPS satellites 102a-b. Transmitted satellite signals may include, for example, signals marked with a repeating pseudo-random noise (PN) code of a set number of chips and may be located on ground based control stations, user equipment and/or space vehicles. The techniques provided herein may be applied to, or otherwise implemented, for use in various other systems, such as, e.g., Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with, or otherwise enabled, for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS, SPS-like, and/or other signals associated with such one or more SPS.

In some embodiments, the environment 100 may further include a network 110 (e.g., a cellular wireless network, a WiFi network, a packet-based private or public network, such as the public Internet), in communication with one or more of the servers 120, 122, and/or the various wireless nodes of the environment 100. Either of the servers 120 and 122 may communicate, via the network 110 or via wireless transceivers included with the servers 120 and 122, with multiple network elements or nodes, and/or mobile wireless devices. For example, the server 120 may be configured to establish communication links with one or more of the WLAN nodes (e.g., in order to establish a communication link with a device, such as the device 108), such as the access points 106a-e, which may be part of the network 110, to communicate data and/or control signals to those access points, and receive data and/or control signals from the access points. Each of the access points 106a-e can, in turn, establish communication links with devices (e.g., mobile devices) located within range of the respective access points 106a-e. The servers 120 and 122 may also be configured to establish communication links (directly via a wireless transceiver(s), or indirectly, via a network connection) with one or more of the WWAN nodes (such as the WWAN access points 104a-c depicted in FIG. 1, which may also be part of the network 110), and/or to establish communication links with a wireless device, such as the device 108.

Figure 2:
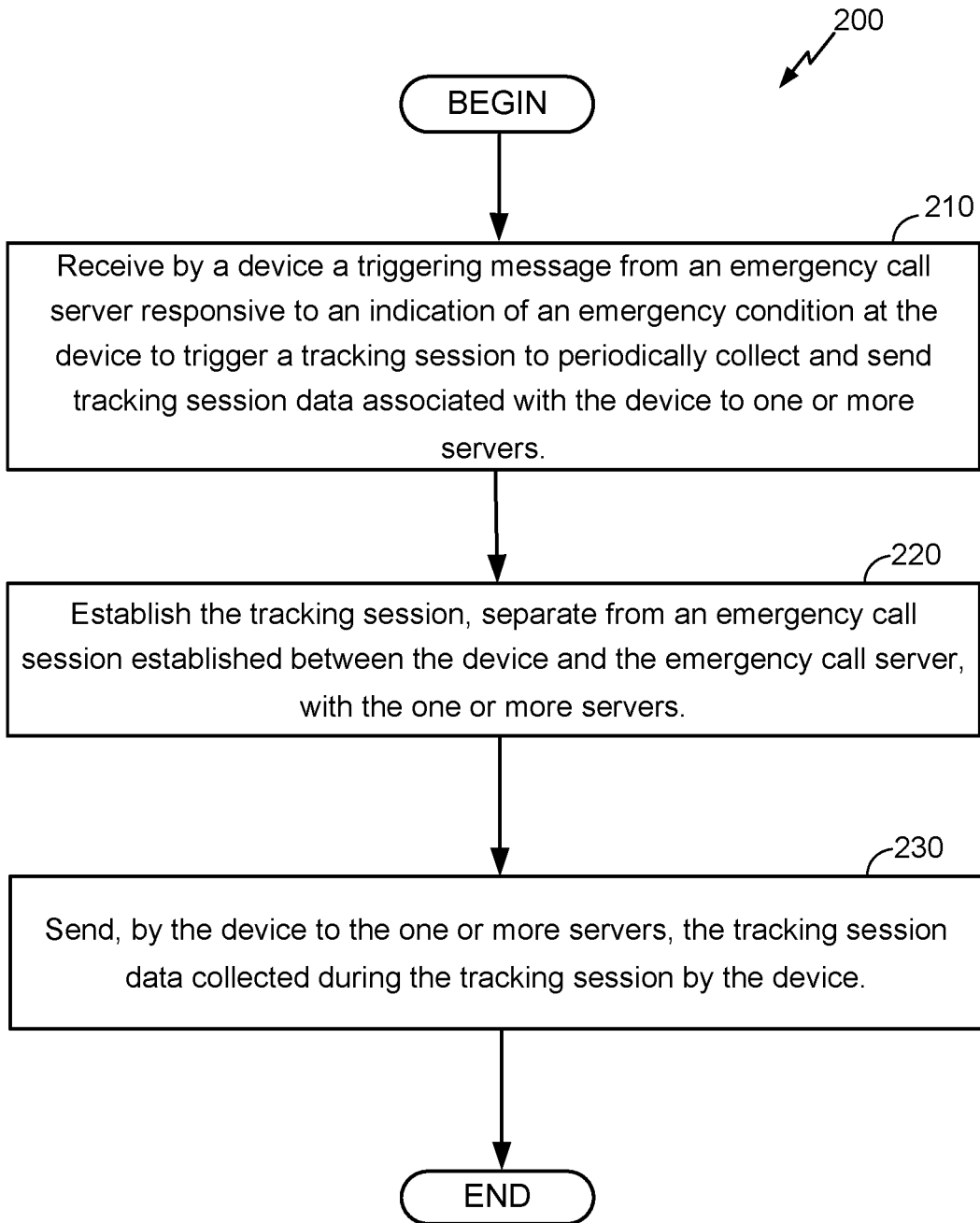
FIG. 2 is a flowchart of an example procedure to facilitate provisioning of tracking session data by a device.
Figure 3:
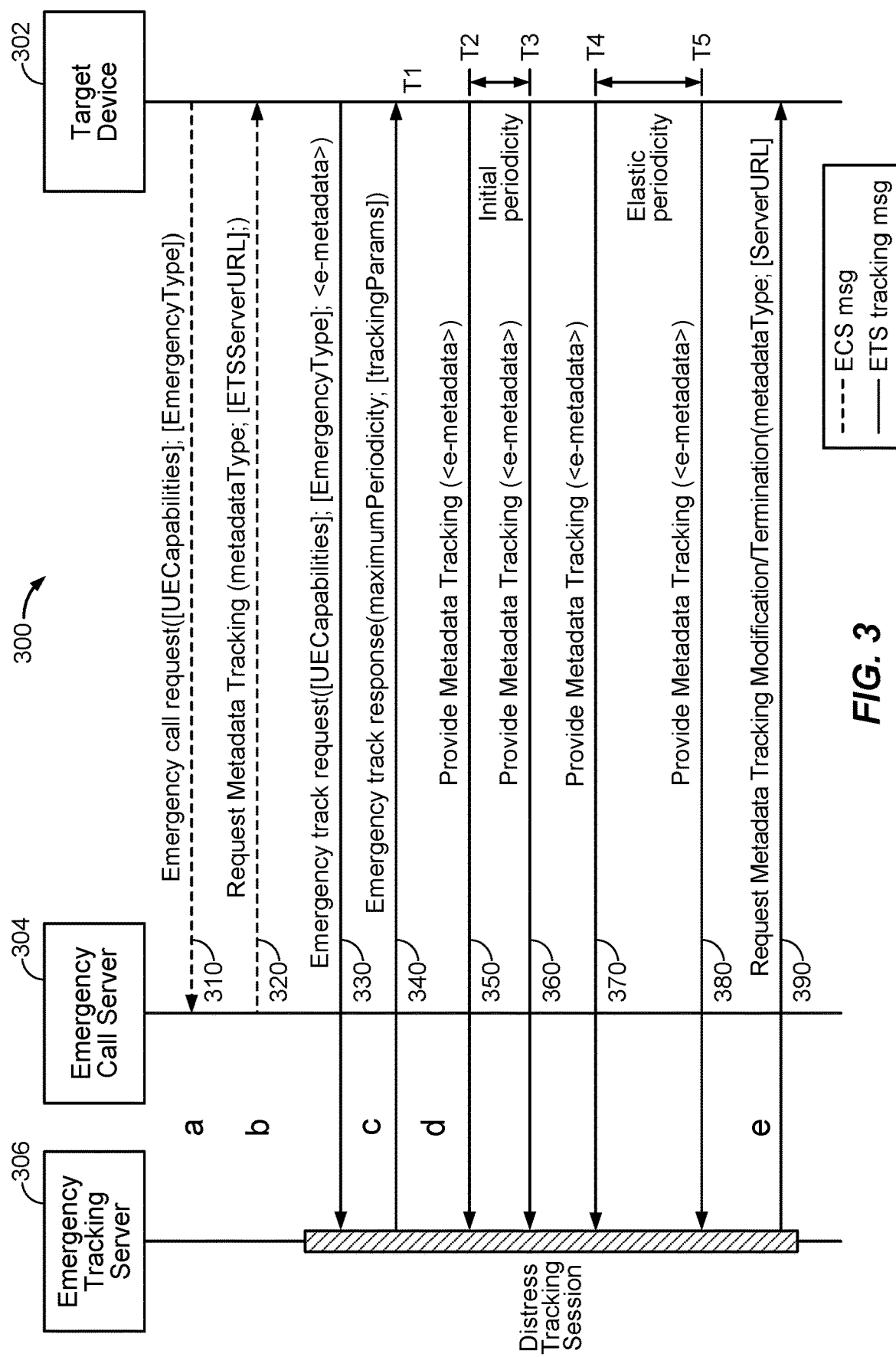
FIG. 3 is a flow diagram of example implementations of data communication in emergency situations.

With reference to FIG. 2, a flowchart of an example procedure 200 to facilitate provisioning of tracking session data (emergency data or metadata) by a device (which may be a personal mobile device, a vehicle-installed wireless device, etc., and which similar in configuration and functionality to the device 108 depicted in FIG. 1) in situations involving an emergency is shown. Details regarding the procedure 200 are also provided with respect to FIG. 3 showing an example call flow diagram 300 illustrating example implementations of data communication in emergency situations. Thus, as shown, the procedure 200 includes receiving 210 by a device (such as the device 108) a triggering message from an emergency call server (which may be similar, in configuration and/or functionality, to the server 120 of FIG. 1) responsive to an indication of an emergency condition at the device to trigger a tracking session to periodically collect and send tracking session data associated with the device to one or more servers. The indication of the emergency condition may have been sent at the initiative of the device, or may have been sent by another device (associated with a third-party reporting an emergency involving another party). Examples of the indication of the emergency condition transmitted to the emergency call server include an E911-based message, an eCall message, and so on. The indication of the emergency condition (i.e., emergency message) may be transmitted to the emergency call server through one or more access points with which the device may establish a communication link. For example, in FIG. 1 the emergency message may be communicated to the emergency call server 120 via the base station 104a. However, a communication link to the emergency call server 120 may be established via any other of the access points, via the network 110, or directly between the device and the server 120 (i.e., without any intermediary nodes through which the emergency message is to be routed). The establishment of an emergency session between the device and the emergency call server may include establishment of voice-based communication link between the two devices, as well as a data and control channel between the two devices (which may operate autonomously from the voice-data link/channel). The voice-based link may connect a live operator with the user operating the device sending the indication of the emergency condition. Alternatively, the voice-based link may connect the user of the device with an automated voice prompt that guides the user to provide pertinent information regarding the emergency. In some embodiments, the indication of the emergency may be sent as one of a long-term evolution positioning protocol (LPP) message, a session initiation protocol (SIP) message, a universal mobile telecommunication system (UMTS) message, or a secured hypertext transfer protocol (HTTPS), or any combination thereof. In some embodiments, the indication of the emergency condition may be initiated by the device (e.g., the device detects, determines, or is notified of the existence of an emergency condition, and commences communication with the emergency call server). Alternatively, the indication of the emergency condition may be communicated to the emergency call server in response to a message (e.g., a broadcast message) that the device receives from the emergency call server (for example, the emergency call server may be configured to poll devices to determine if any of those devices may have an existing emergency condition). In some embodiments, a triggering message sent by the emergency call server (in response to a reporting message sent by some device associated with a third-party that is different from the user of the device to which the triggering message is sent) may be configured to cause the receiving device (e.g., the device 108) to respond to the request message in some manner (for example, to enter a tracking session with some designated emergency tracking server) without the device or its user being able to exercise discretion.

Example operations to cause notification of an emergency condition and to communicate tracking session data are also illustrated in FIG. 3, which shows an example emergency-call-request message 310 which may be transmitted from a target device 302 (which may be similar to, in configuration and/or functionality, to the device 108 of FIG. 1) to an emergency call server 304 (which may be similar, in configuration and/or functionality, to the server 120 of FIG. 1). As noted, the indication of the emergency condition may have been transmitted from another, different, device that reports an emergency involving the device 302 or the user of the device 302. In some implementations, the server 304 may be a PSAP server. The emergency-call-request message 310 may be configured according to a session initiation protocol (SIP), a long-term evolution (LTE) positioning protocol (LPP), a universal mobile telecommunication system (UMTS) protocol, a secured hypertext transfer protocol (HTTPS), or may be configured according to any other communication protocol for establishing connectivity and interactivity between the target device (108 or 302) and another device/server. As shown in FIG. 3, the emergency-call-request message 310 (in this example, transmitted from the device 302) may include information such as the device (UE) capabilities to provide data regarding the capabilities and resources of the mobile device (e.g., available to support communications sessions), and the emergency type (e.g., medical, vehicular, criminal, etc.) Although not shown in FIG. 3, the data included with the emergency call request message 310 may also include, in some embodiments, positioning information, e.g., a position approximation derived by the target device and/or by a location server based on signals received by the target device, measurements of signals received by the target device and communicated in whole or in part to the server 304, indication of near-by access points (from which an approximate or coarse position of the mobile device may be derived), etc. Other information that may be included with the message 310 may include current battery level, an estimate of how much data collection the device could be able to afford with current battery level, and so on.

In some implementations, the data included with the emergency call request message 310 may be used to determine, e.g., by the emergency call server 304 and/or by some other server, whether a tracking session (which is generally a separate/different session than the current emergency call session established between the target device 302 and the emergency call server 304) should be established between the target device 302 and one or more emergency tracking servers, such as a server 306 depicted schematically in FIG. 3 (the server 306 may be similar, in configuration and/or functionality, to the server 122 depicted in FIG. 1). A determination as to whether a tracking session should be established may be based, for example, on the device capabilities of the target device 302 that may have been communicated in the message 310. For instance, the capabilities information may include such information as the transceivers and/or sensors of the target device 302, communication protocols that are supported by the target device 302, etc., and may thus indicate whether the target device can establish a tracking session with the emergency tracking server 306. Alternatively and/or additionally, the decision to start a tracking session may be conditioned so that a minimum amount of battery power needs to currently be available at the device (in such embodiments, the request message 310 may thus include the battery level of the target device). A tracking session request may be communicated to the target mobile device 302 in response to a determination that the device capabilities for the device (as specified, for example, in the message 310) match or exceed the requirements/criteria for establishing a tracking session. The determination as to whether the tracking session should be established may also be based on the type of emergency indicated in the information communicated in the message 310. For example, a medical emergency may warrant a tracking session in order to periodically send update information about a person's on-going medical condition (the person may be the user of the target device that sent the message 310), send data about changes to the user location (so that a dispatched emergency crew would more quickly locate the person affected), etc. On the other hand, an emergency to report possible criminal activity affecting a person other than the caller may not warrant transmission of periodic tracking session data (e.g., because the reporting person may have left the scene and can no longer provide data germane to the emergency situation). Furthermore, the determination as to whether a tracking session should be initiated may also be based on input from a live operator with which the user of the target device may be interacting. For example, notwithstanding that the target device may have the requisite capabilities to support a tracking session, it may be decided by the live operator to forego a tracking session if the live operator determines, for example, that the emergency does not warrant a tracking session (e.g., the emergency is of a relative minor nature), that the user of the device is reporting the emergency on behalf of some third party (in which case, obtaining further tracking session data would not provide any further useful information), the tracking session itself may place the device user in a more dangerous situation than the current one, etc. Thus, any number of procedures/techniques to determine whether a tracking session should be established based on factors/criteria/requirements, such as the type of emergency, device capabilities, device battery level, user condition (e.g., not tracking a third party reporting the emergency but not otherwise affected by it), may be implemented (including procedures to send a request to one or more devices that have not initiated an emergency call, to trigger a tracking session on them, e.g., disaster scenarios).

Thus, if it is determined that a tracking session is to be initiated, the emergency call server 304 is configured to transmit a triggering message, e.g., a Request Metadata Tracking message 320 in the example of FIG. 3, that is configured to cause the receiving device (in this case, the target device 302) to trigger or commence a tracking session, as will be more particularly discussed below, to cause the mobile device to periodically collect and send tracking session data (metadata or emergency data) associated with the mobile device to one or more emergency tracking servers. The tracking session that is to be initiated is separate (e.g., different and/or independent) from the emergency call session between the emergency call server 304 and the device 302. The message 320 may be configured or formatted according to the same communication protocol as that of the initiating message 310 (e.g., according to a SIP protocol, an LPP protocol, a UMTS protocol, a HTTPS protocol, or some other protocol), and may include (e.g., in data fields defined for the message) such information as the data types (denoted "metadata Type" in FIG. 3) that are to be collected and periodically communicated by the target mobile device to an emergency tracking server (e.g., for a medical emergency, the data types may include positioning data reflecting changes to the position of the mobile device, biometric data, etc.), and information identifying the emergency tracking server(s) (denoted as "ETSServer URL" in FIG. 3) to which the tracking data (or metadata) collected by the target device 302 is to be transmitted. For example, in some embodiments, the message 320 may include a URL identification for the emergency tracking server(s), a network address, a telephone number, some other unique identifier of the server(s) that will receive the collected metadata or tracking session data, etc. In some embodiments, upon receipt, by the target device 302, of the triggering message (e.g., the Request Metadata Tracking message 320), the communication link between the target device 302 and the emergency call server 304 may be terminated.

Turning back to FIG. 2, having received the triggering message, the tracking session, separate (e.g., different and/or independent) from the emergency call session between the device and the emergency call server, is established 220 between the device (108 or 302) and one or more servers. In some embodiments, establishment of the separate tracking session requires establishment of different communication links with emergency tracking server(s) (such as the server 122 of FIG. 1, or the server 306 of FIG. 3). In some embodiments, the emergency call server 304 may also be used to realize the emergency tracking server 306 configured to receive, process and communicate tracking data from target devices (such as the mobile device 108 or the device 302 of FIGS. 1 and 3, respectively).

As illustrated in FIG. 3, the target device may communicate an Emergency track request message 330 to one or more servers that were identified in the Request Metadata Tracking message 320 the target device 302 received, e.g., the Emergency track request message 330 may be transmitted to the emergency tracking server(s) corresponding to the URL's that were provided by the server 304 in the message 320. The Emergency track request message 330 may include the device capabilities of the device 302 (which may be the same or different from the information provided with the message 310 communicated to the emergency call server 304), information of the emergency type (which may also be the same or different from the information regarding the emergency type provided with the message 310), device level of battery or an estimate of how long the device is able to sustain a tracking session, and may also provide an initial snap shot of the tracking data that is to be periodically sent by the target device 302 (the metadata/tracking session data is provided in the "e-metadata" field of the message 330). As described herein, the particular tracking session data that is to be collected may have been determined during the emergency call session between the server 304 and the target device, and specified in the Request Metadata Tracking message 320 sent by the server 304 to the target device 302. The Emergency track request message 330 sent to the emergency tracking server(s) may include additional type of information not shown in FIG. 3, such as the length of the tracking session needed to be covered until emergency crew arrives, such data being indicative of an estimated time of arrival (ETA) for the emergency response (which may be used to decide on different levels of data granularity to be collected). The message 330 (and any subsequent messages sent during the tracking session) may conform to various communication protocols, such as the SIP protocol, or any other protocol through which the target device 302 and the emergency tracking server(s) may communicate. The emergency tracking server(s) 306 is configured to receive the tracking session data/metadata collected by the target device 302, process it (e.g., derive updated position approximations for the device), derive updated information regarding the emergency (e.g., updated biometric information), and communicate the data to appropriate devices associated with emergency personnel dispatched to handle the emergency or to global databases and expert systems (e.g., to derive and maintain statistics such as emergency resolution statistics, insurance risk analysis, etc.)

In some embodiments, and as further illustrated in FIG. 3, in response to receiving the Emergency track request message 330 from the target device 302 (which may have included the target device's capabilities, emergency type, and/or a set of tracking session data collected by the target device), the emergency tracking server 306 may generate and communicate to the target device 302 an Emergency track response message 340. In order to limit the processing load for the server(s) 306 (which may be based on the number of devices/clients served by the server 306, bandwidth and/or other resource limitations of the server 306, etc.), the response message 340 may include, in some embodiments, data indicating a maximum periodicity (e.g., maximum frequency of data transmissions, reflective of the minimum time interval allowed between consecutive transmissions/uploads of tracking data in order to help protect the tracking server from crashing due to data transmission overload).

In some embodiments, the user and/or any of the one or more emergency tracking servers (such as the server 306 depicted in FIG. 3) may be able to terminate the triggered tracking session. For example, if the user is not directly involved in the emergency (and merely reported the occurrence of the emergency), that user may not wish to have its device transmit tracking session data (with such tracking session data having been automatically scheduled for transmission as a result of the triggering message sent from the emergency call server). In that situation, the user may be able to enter a code (a password) and/or follow some sequence of operations (e.g., press buttons of the device according to some pre-determined pattern) in order to override the triggered tracking session (which may also have resulted in the device entering an emergency power setting, as will more particularly be described below). In another example, the emergency tracking server (e.g., the server 122 of FIG. 1 or the server 306 of FIG. 3), may determine that the tracking session may be terminated (e.g., due to resource constraints because, for example, there is not enough bandwidth to track a large number of current tracking sessions, because an emergency crew reached the place of emergency, or for some other reason). Under such circumstances, the emergency tracking server(s) may be configured to transmit a session-termination message configured to cause the device to abort the tracking session, including to revert to normal power setting for the device and to terminate the links between the device and the emergency tracking server(s). In addition, the emergency tracking server may direct the device to change its tracking behavior, such as the type of tracking data to be collected, the amount of data to be collected, or a combination thereof. Yet another command message could direct the device to seek the continuation of the tracking session with a different emergency tracking server than the one currently handling the tracking session, due to, for instance, limitations of the current tracking server to handle the device tracking session (e.g., redirection to another tracking server).

As noted, in some embodiments, in response to receiving the triggering message from the emergency call server (to which the indication of the emergency condition was sent) to establish the separate tracking session, the device may be placed in a reduced-power tracking mode state. For example, power provided to sub-systems of the device not required to collect or communicate the tracking session data associated with the device is reduced, and at least partial power to one or more sensor or communication sub-systems of the device is provided to cause the one or more sensor or communication sub-systems to operate at least partially while the device is in the reduced-power tracking mode state in order to communicate to the one or more servers at least some of the tracking session data. Thus, when a tracking session is commenced, the target device enters (generally automatically) an emergency power setting in order to preserve power so that the device's resources can be dedicated to supporting the tracking session and dealing with the emergency condition. In the reduced-power tracking mode state, the target device's sub-systems, such as the display/video sub-system, the application processor sub-system (supporting general purpose non-emergency related functionality, for example, e-mail functionality), and other similar sub-systems controlling functions that are not required for collecting or communicating emergency data, have their functions significantly reduced (or altogether shut off). For example, the application processor may go through a cleanup process, with most background activities being shut down, and may inform other sub-systems of the emergency mode. The application processor sub-system may be placed in reduced-power state (or sleep mode) as soon as emergency call finishes and emergency tracking session commences. The emergency reduced-power tracking mode state setting may be realized using a pre-determined or a dynamically derivable power profile (e.g., based on tracking parameters specified, for example, in the message 340 sent by an emergency tracking server) to shut off and/or provide power at a specified level to various ones of the device's sub-systems.

As noted, during an interval occurring while the device is under the emergency power setting (i.e., the reduced-power tracking mode state setting), some sensors and other sub-systems (including the communication sub-systems, such as the various transceivers of the mobile device) may be kept awake so as to operate with at least partial capability or capacity. For example, the modem sub-system, which is responsible for requesting, collecting, and uploading device metadata to a location server, may, when an emergency condition has occurred, query the Bluetooth® wireless technology sub-system to determine/identify available wearables, and register Bluetooth® wireless technology data collection, as well as WLAN (e.g., WiFi) and WWAN data collection. A wake-up timer for tracking session data (emergency data/metadata) gathering, packing, and uploading may be set accordingly. In another example, the connectivity sub-systems (e.g., the WWAN/WLAN/Bluetooth® wireless technology transceivers) may be kept awake (e.g., in hard awake state, regardless of device power status), to generate and communicate WWAN/WLAN data, as well as to connect to wearables (e.g., via Bluetooth® wireless technology, or via some other near-field technology). As a further example, the sensor sub-system may be kept in hard awake state so as to generate sensor data (from the accelerometer, the gyroscope, barometer, etc.) if needed. In some embodiments, at least some of sub-systems required to collect and communicate tracking session data may be intermittently (for power saving purpose) powered on to collect data and/or perform measurements.

The sensors or other sub-systems that would be required to collect and communicate data may be determined, at least in part, based on the tracking parameter specified, for example, in the response message such as the message 340, sent to the device as part of the tracking-session establishment procedure. At specified time instances during the tracking session (while the device is operating under the emergency-power setting) one or more of communication transceivers may be powered on to cause a periodic transmission of at least some of the tracking session data collected (such data either being collected during the interval, or upon sub-systems involved in the emergency data collection and communication being awaken according to the determined wake-up times). While the actual power consumption of the device may fluctuate when the device is performing a tracking session, the total power consumed during that time may generally not exceed some pre-determined level (which, as noted, is a level reduced from the power level achieved during normal operation of the device when the device is not supporting a tracking session due to an emergency condition).

Sensor devices and modules which may be kept awake (although may be operated at a lower than normal power setting) may include sensors housed within the device, including one or more inertial/orientation sensors (e.g., accelerometer, gyroscope, magnetometer, etc.), a thermometer, a barometer, an optical sensor, a humidity sensor, an ambient light sensor, and so on. The sensors devices and modules that collect tracking session data may also include sensors that are housed outside the device (possibly even remotely from the device), and may include one or more biometric sensors (e.g., heart monitor, oxygen monitor, respiratory sensor, etc.), one or more vehicle sensors for a vehicle from which the emergency message was sent (e.g., oil gauge sensor, engine temperature sensor, fuel gauge sensor, dashboard-based gauges and sensors, etc.) Sensors not directly coupled to the device, such as vehicle sensors, or various biometric sensors, may need to establish communication links (e.g., via near-field transceivers or interfaces of the device), and thus the emergency power setting activated during a tracking session may be used (e.g., by a controller of the mobile device) to periodically/intermittently initiate a communication link to any one of the remote sensor devices or modules in order to obtain measurement/tracking data from those sensor devices and/or modules.

The target device's sensors devices and modules, which may operate during a tracking session, may also include transceivers and other sensory modules (e.g., an RTT module, an RSSI module, etc.) to read/measure radio signals from network nodes (e.g., WLAN nodes, WWAN nodes, near-field nodes, etc.), which may be used (by the target device or by a remote server, such as the emergency tracking server 306 or some other location server) to determine location-based data for the device. As such, data collected by these sensor devices may include location-based data, WiFi access point information, Bluetooth low energy (BTLE) information, and/or ranging information. The data collected during the tracking session may also include identification information associated with the target device (e.g., its MAC address), as well as data collected via direct coupling ports (e.g., USB ports). Some of the device's communication and sensor sub-systems (e.g., one or more of its transceivers, such as WWAN or WLAN transceivers) may, at least periodically, be put in their ON state in order to transmit to remote devices/nodes (such as the emergency tracking server 306 of FIG. 3) data collected by the sensors and other sub-systems that the device maintains in an active state, or a partial active state, during the tracking session.

In some embodiments, when the target device enters a tracking session, the device may be configured to prevent or inhibit deactivation of sensor and communication sub-systems of the device required for collection and communication of the tracking session data. Thus, in order to ensure that emergency service can be provided to remedy the emergency condition, the device may be configured to continue operating in emergency mode (e.g., reduced power state) in which tracking session data can still be collected and communicated to emergency tracking servers even if the user attempts (and possibly succeeds) to shut down (e.g., power down) the device.

Turning back to FIG. 2, tracking session data collected during the tracking session (from sensors and other sub-systems that are activated or contacted, intermittently or continually, by the device while the device is operating in reduced-power/emergency-power state) is sent 230 to the one or more servers (e.g., emergency tracking servers that may each be dedicated to a particular emergency, such as a fire emergency, a medical emergency, a rescue emergency, a road-side emergency, etc.) with which the device has established the tracking session. In some embodiments, the device (e.g., the device 108 of FIG. 1 or the device 302 of FIG. 3) may determine the time instance(s) at which to send/transmit at least some of the collected tracking session data. The periodicity of the intervals to collect data, and/or the time instances at which at least some of data collected in the preceding interval(s) is to be sent, may be elastic/adjustable, i.e., the device may determine adjustable periods to collect and send tracking session data based on, for example, a maximum periodicity value (which may have been determined by the one or more emergency servers and indicated, for example, in the message 340 sent to the device), battery level of the device (e.g., as battery level decreases, the period between consecutive transmissions to the one or more emergency servers may be extended so as to preserve power), the time that has elapsed since the indication of the emergency condition was last transmitted to the emergency call server (e.g., in some embodiments, the more time that has elapsed, the less useful some of data collect may become), amount of data collected, connectivity bandwidth, estimated arrival time of the emergency crew, etc. Thus, in some embodiments, sending the tracking session data may include determining at a first time instance one or more subsequent wake-up times to transmit data to the one or more servers. Determining the one or more subsequent wake-up times may include determining one or more subsequent adjustable periodic wake-up times to transmit the tracking session data to the one or more servers based on, for example, charge level of a battery of the device, time elapsed since the emergency message (e.g., the indication of the emergency condition) was communicated, a maximum periodicity for communicating by the device the tracking session data, or connectivity bandwidth, or any combination thereof.

The tracking session data transmitted is subsequently received and processed by the one or more emergency servers. For example, the one or more emergency servers (e.g., emergency tracking servers) may use the received tracking session data to update location data for the target device (e.g., they may use range information, other types of location-based measurements, inertial sensor measurements, as well as previously computed location approximations for the device, to derive a current location approximation for the device). In embodiments in which the tracking session data includes sensor data from sensors external to the device (e.g., biometric sensors and/or vehicle sensors in communication with the device), the one or more emergency tracking server may compute information relevant to the emergency condition (e.g., vitals for a user of the device who is experiencing a medical emergency). Processing of the received tracking session data may also include communicating data (e.g., the actual raw data received from the device, or resultant processed data processed based on the raw data received from the device) to one or more remote devices such as devices associated with emergency crews dispatched to handle the emergency condition, and/or communicating the data to specialized database and expert systems (e.g., to compute statistics for insurance risk analysis, for emergency resolution analysis, etc.)

FIG. 3 illustrates an example of the periodic sending of tracking session data to the example emergency tracking server 306 with which the device 302 has established a tracking session link. In the example of FIG. 3, upon receiving the emergency track response message 340 from the emergency tracking server 306, which includes the tracking parameters with respect to which the target device is to communicate data, and a maximum periodicity value, the device may compute one or more subsequent time instances at which tracking session data (e.g., according to the tracking parameters indicated in the message 340) will be collected for transmission. In some embodiments, the device may compute only a single subsequent time instance, and will compute the next after sending the corresponding set of tracking session data at that subsequent time instance. Determining only a single subsequent time instance at a time may be done, for example, when determination of the transmission times depends heavily on the power level of the battery, degree (amount) of data change from one collection to the next (e.g., how much the data has changed), and other such considerations. In such circumstances, computation of the data gathering/transmission times may be performed one at a time so that, for example, upon computation of the next data gathering/transmission time, the most up-to-date power level of the device's battery may be taken into account. On the other hand, in some embodiments, multiple subsequent data gathering/transmission times may be computed, with the time interval length between successive interval increasing (in some embodiments) according to some formulation that is based on one or more of, for example, the battery level, the maximum periodicity value, the time elapsed since the indication of the emergency condition was sent to the emergency call server, the nature of the emergency, the bandwidth available for transmission of the collected data, other resources that are available to the device to perform transmission of the tracking session data, and/or on other factors.

Thus, in FIG. 3, at some time T1, a subsequent time instance, T2, may be determined at which tracking session data collected by the device 302 will be sent, via message 350, to the emergency tracking server 306. The device may determine at T1, or at some other later point (e.g., at time T2, when the message 350 is transmitted) a further time instance T3 at which tracking session data collected by the device (e.g., data collected either between the time instances T2 and T3, or approximately at the time instance T3) is communicated, via a message 360, to the emergency tracking server 306. The period between T3 and T2 defines, for the example of FIG. 3, the initial periodicity. The device 302 may also determine the subsequent time instance (i.e., the next transmission times) T4, T5, and/or additional time instances, with some of those future time instances either determined together (i.e., substantially simultaneously) or separately. As shown in FIG. 3, the periods between transmission times may remain constant for some of the intervals (e.g., the period defined by T4 and T3 is substantially the same, in the example of FIG. 3, as the initial periodicity defined by T3 and T2), but may change for later transmission times. For example, the periodicity subsequent to the transmission of a tracking session data message 370 at T4 may be decreased (e.g., if, for example, the battery level for the device 302 has decreased to an extent that requires longer intervals between transmissions), and, therefore, the period defined by the transmission time instances T5 (at which a tracking session data message 380 is transmitted) and T4 is larger than for earlier periods. The adjustable time period may be constrained by the "maximum periodicity" value received, for example, with the emergency track response message 340 sent by the emergency tracking server 306. The maximum periodicity value may correspond to the maximum pace (frequency) of data transmission that the emergency tracking server may need to handle by the device under distress/ emergency (thus defining a minimum time interval between transmissions). This may ensure that the tracking server(s) can budget its own load based, for instance, on the number of devices in distress it is currently handling.

As further shown in FIG. 3, in some embodiments, the tracking session may be terminated by the emergency tracking server 306 which transmits a Request Metadata Tracking Modification/Termination message 390. In some embodiments, termination of the tracking session may be initiated by the device 302, or by some other device or entity. The message 390, when received and processed by the device 302, is configured to cause the communication links between the device 302 and the emergency tracking server 306 to be terminated, and for the tracking session operations (e.g., collection and communication of tracking session data at time instances determined by the device 302) to be terminated. The termination of the tracking session also causes normal power setting, and normal device operation, to be restored. In some embodiments, the message 390 may alternatively and/or additionally be configured to modify the tracking session (e.g., to request the device 302 to modify the types of data it collects and transmits, to modify the times at which that data is sent, request change of tracking server serving the distressed device, etc.)

In some embodiments, messages sent during an emergency call session and/or a tracking session may be communicated with at least a portion of the communicated data being processed (e.g., signed/encrypted) using a private key (from an asymmetric private/public cryptographic key, such as an ECDSA key) assigned to the originating/transmitting device to confirm the authenticity of the communicated data/identity of device. The receiving device can subsequently use the public key of the originating device (that public key may already be available at the receiving device, be it the mobile device or one of the servers) to decrypt the encrypted portion of the transmitted data to thus confirm the authenticity of the data, as well as identity of the device under distress (and possibly the identity of the device user). For example, data transmitted by the originating device (such as the mobile device 108 or the device 302 of FIGS. 1 and 3) may include some predetermined message that is encrypted using the originating device's private key. The receiving/destination device (e.g., the servers 120, 122, 304, and/or 306 depicted in FIGS. 1 and 3) decrypts that encrypted message to recover the message, and compares it to the expected predetermined message that was supposed to be sent by the originating device. If there is a match, the data received at the destination device is deemed to have been received from the correct device or user. Authentication of the device producing the data may be used to protect against, for example, prank calls. In some embodiments, in addition to encrypting at least a portion of the data communicated by the originating device in order to authenticate the data, at least some other portion of the communicated data may be encrypted so as to secure the data. For example, the data transmitted (e.g., tracking session data transmitted to an emergency tracking server) may be encrypted using a secret encryption key (which may be a symmetric or asymmetric cryptographic key) that is known, or is disclosed, to the receiving/destination device. Data security may be implemented in order to ensure the soundness of the data communicated, and/or to provide data privacy (e.g., to protect against hackers/rogue individuals trying to foil emergency service providers from responding to the emergency situation).

Figure 4:
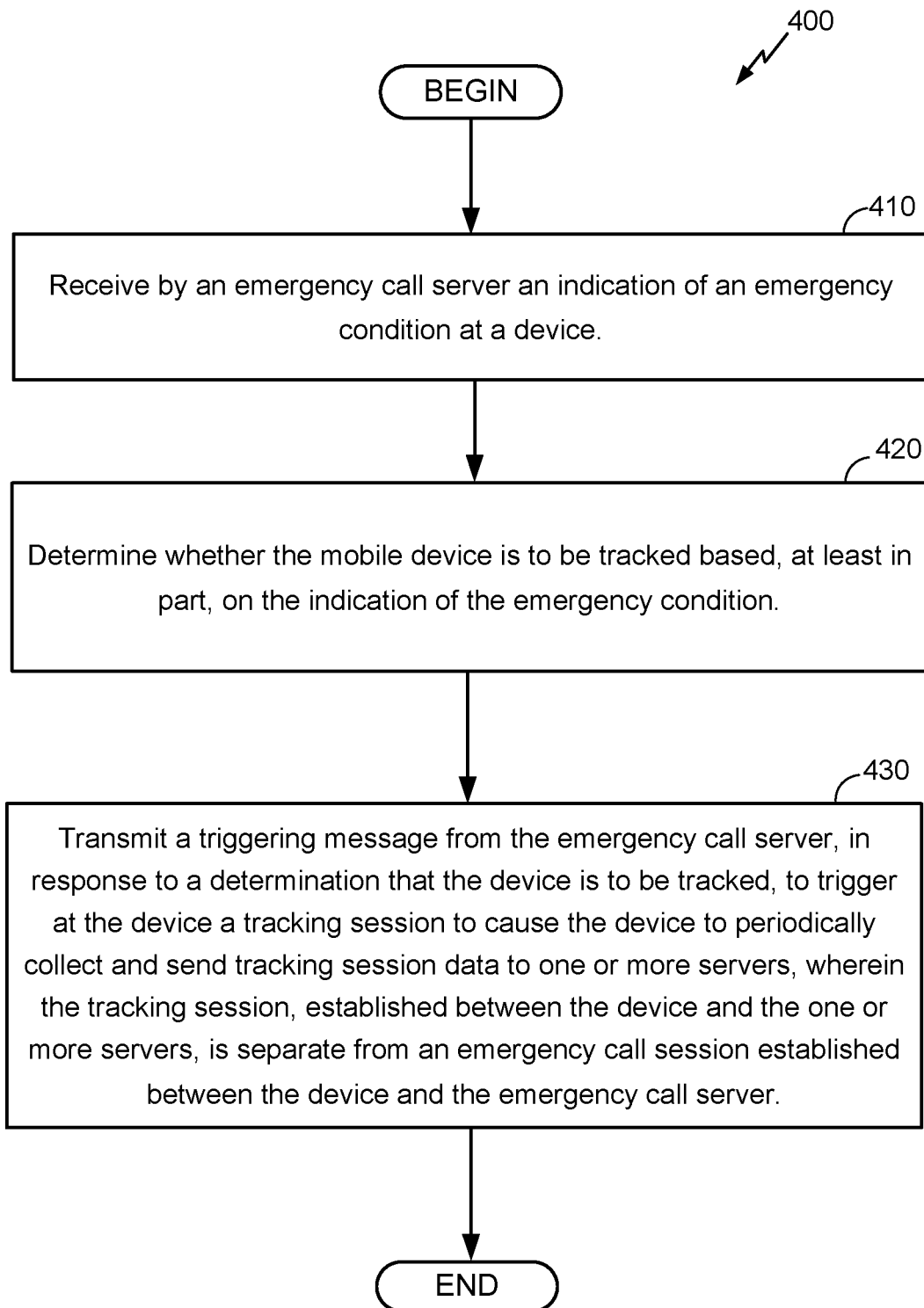
FIG. 4 is a flowchart of an example procedure, generally performed at an emergency call server, to process emergency communications and facilitate establishment of tracking sessions.

With reference now to FIG. 4, a flowchart of an example procedure 400, generally performed at an emergency call server (such as the server 120 of FIG. 1 or the server 304 of FIG. 3), to process emergency communications and facilitate establishment of a tracking session, is shown. The procedure 400 includes receiving 410 by an emergency call server an indication of an emergency condition at a device (such as the mobile device 108 or the device 302 of FIGS. 1 and 3, respectively). As described herein, the indication of the emergency condition may be a message configured according to any one of various possible protocols, including session initiation protocol (SIP), a long-term evolution (LTE) positioning protocol (LPP), secured hypertext transfer protocol (HTTPS), a universal mobile telecommunication system (UMTS) protocol, or other types of protocols. The received indication of the emergency condition may include such information as the device capabilities of the device, data representative of the type of emergency, location-based data, device processing capabilities, etc.

In some embodiments, transmission of the indication of the emergency condition may have been initiated by the target device, e.g., upon determining the existence of an emergency, the device, such as the device 108 of FIG. 1, sends an initiating/originating message to an emergency call server. In some embodiments, the indication of the emergency condition may have been transmitted by the target device in response a broadcast message (which may be one of periodically transmitted broadcast messages) transmitted by the emergency call server. Thus, in such embodiments, receiving the indication of the emergency condition may include transmitting to one or more devices, including the device, a broadcast message configured to cause a determination of whether at least one of the one or more devices has an emergency, and receiving, in response to the broadcast message transmitted by the emergency call server, a reply message from the device, the reply message including the indication of the emergency condition. Additionally, in some embodiments, a user device receiving an unsolicited message (i.e., a message received independently of the device's actions) from an emergency call server may be configured, in response to that received message, to respond to that unsolicited message or to establish a tracking session with some designated emergency tracking server, without the device or its user exercising any discretion as to whether to take action in response to the unsolicited message (e.g., in situation where the receiving device's user is not able to respond to the unsolicited message).

Having received the indication of the emergency condition, a determination is made 420 whether the device is to be tracked based, at least in part, on the indication of the emergency condition. As discussed herein, determining whether a tracking session should be established may be based, for example, on the device capabilities information of the target device from which the indication of the emergency condition was received. For example, the capabilities information may indicate whether the target device is capable of establishing a tracking session with an emergency tracking server (directly or via other network node(s)). Whether the target device can support a tracking session may depend on, for example, the types of transceivers included with the device, the types of communication protocols that can be supported by the device, types of sensors included with the device, battery level of the device, etc. In another example, the type of emergency may be used to determine if a tracking session is required, e.g., a medical emergency may warrant a tracking session in order to periodically collect and send update information about a person's on-going medical condition. Furthermore, the determination as to whether a tracking session should be initiated may also be based on input from a live operator with which the user of the target device may be interacting. In some embodiments, the emergency call server may also be configured to determine a position of the device based, at least in part, on location-based data (e.g., data representative of identity of access points with which the device is interacting, measurement data such as RTT or RSSI measured by the device for signals it has received, etc.) included in the received indication of the emergency condition. Such positioning data may also be used to determine whether or not to trigger a tracking session, and, if so, the identity of the emergency tracking servers with which the device should establish a tracking session.

In response to a determination (made at 420) that the device is to be tracked, a triggering message (configured according to the same or different protocol as the indication of the emergency condition received from the target device) is transmitted 430 from the emergency call server in order to trigger at the device (that communicated the indication of the emergency condition) a tracking session to cause the device to periodically collect and send tracking session data to one or more servers, with the tracking session (established between the device and the one or more tracking servers) being separate (e.g., different and/or independent) from the emergency call session that was established between the device and the emergency call server. The triggering message may include data such as the type of emergency data (the tracking session data) the device should collect and send to an emergency tracking server (the type of data to collect and send may be determined based on the device capabilities data specified in the indication of the emergency condition, based on the emergency type, etc.) In some embodiments, the triggering message transmitted to the device is further configured to cause the device to operate in a reduced-power tracking mode state in which power to sub-systems of the device not required for collecting and/or communicating tracking session data associated with the device is reduced (e.g., power is substantially cutoff for those sub-systems/modules that are not essential for tracking the device), and in which one or more sensor or communication sub-systems of the device, configured to perform collection and communication of the tracking session data, operate at least partially while the device is in the reduced-power tracking mode state. In situations where the emergency call server receives a reporting message (with the indication of the emergency condition at the target device) from another device (different from the target device) associated with a third-party (e.g., the user of that target device may have become unconscious or is the perpetrator of the emergency), the triggering message may mandate/require the target device to enter a tracking session. Thus, in such situations, transmitting the triggering message from the emergency call server may include transmitting a mandatory tracking session command (e.g., in response to the determination that the device is to be tracked) to cause the device to establish the tracking session, where the mandatory tracking session command cannot be overridden by the device or by a user of the device.

The procedure 400 may also include, in some implementations, determining the one or more tracking servers with which the device is to establish the separate tracking session. The determination of the tracking servers may be based, for example, on the location of the target device, the device's capabilities, etc. The device's location may be determined by the emergency call server based on, for example, location data provided by the target device (e.g., location data included with the indication of the emergency condition, or included in a separate message), with the location data including signal/timing measurements, coarse location (e.g., provided as identifiers of the cell area or of nodes in communication with the device), and so on. Alternatively, the exact or approximate location may be computed directly by the target device. The emergency call server(s) may determine the one or more identifiers representative of the one or more determined tracking servers, and provide those identifiers to the target device. The identifier may be URL's or some other type of addressing information associated with the determined tracking servers (e.g., IP address), which the target device can then use to contact those one or more tracking servers. In some embodiments, the procedure 400 may also include terminating the emergency call session to be (e.g., by sending a message configured to cause the device to end or abort the emergency call session).

Figure 5:
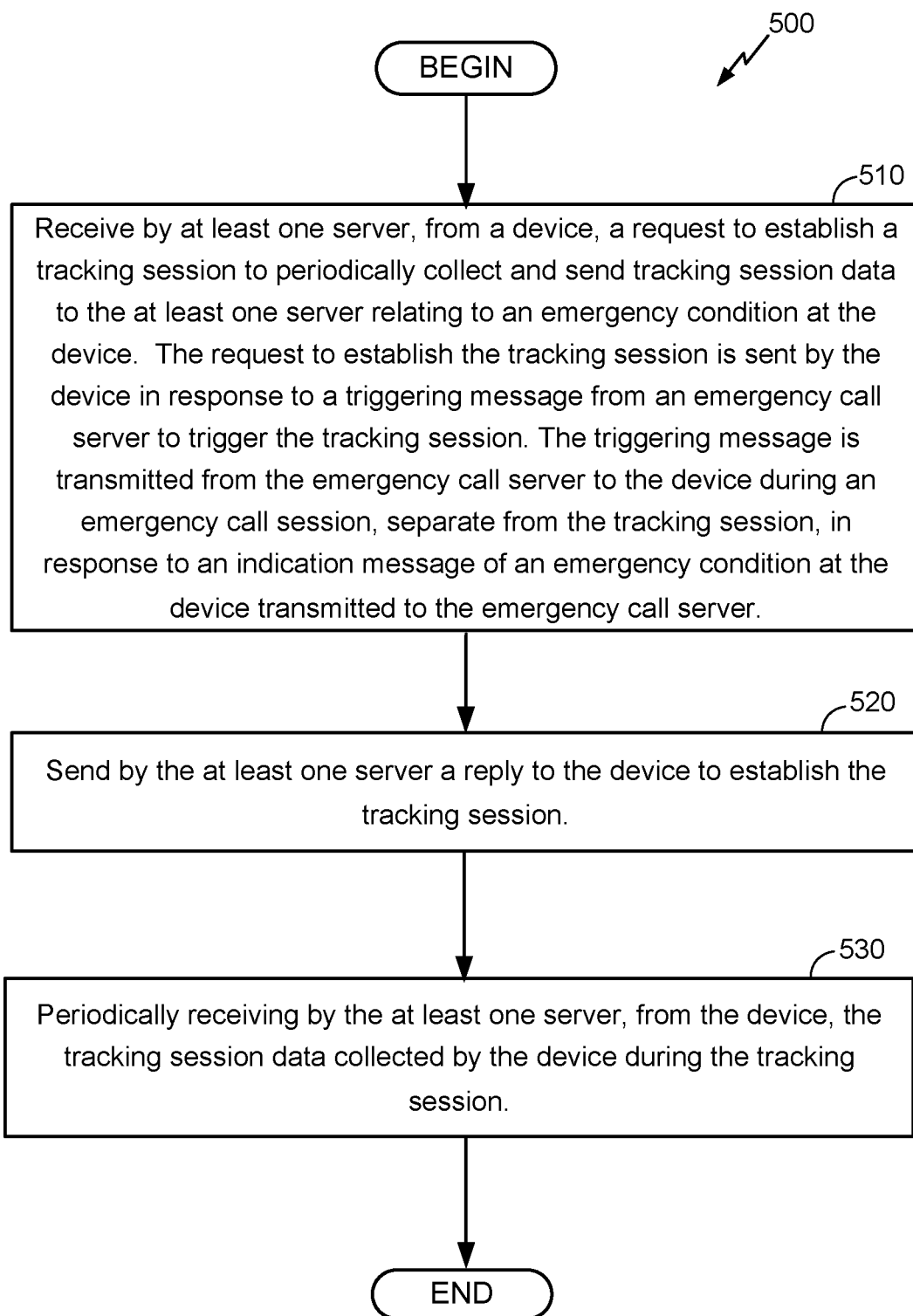
FIG. 5 is a flowchart of an example procedure, generally performed at an emergency tracking server, to receive and process emergency data.

Turning next to FIG. 5, a flowchart of an example procedure 500, generally performed at an emergency tracking server (such as the server 122 of FIG. 1, or the server 306 of FIG. 3), to receive and process emergency data (also referred to as metadata or tracking session data), is shown. The procedure 500 includes receiving 510 by at least one server (e.g., an emergency tracking server), from a device (such as the mobile device 108 or the device 302 of FIGS. 1 and 3, respectively) a request (such as the message 330 of FIG. 3) to establish a tracking session to periodically collect and send tracking session data to the at least one server relating to an emergency condition at the device. The request to establish the tracking session is sent by the device in response to a triggering message from an emergency call server (such as the server 120 or 304 of FIGS. 1 and 3, respectively) to trigger the tracking session. That triggering message may have been sent from the emergency call server in response to a determination (based on an earlier-sent indication of an emergency condition message received by the emergency call server from the device) that a tracking session should be established. The triggering message is transmitted from the emergency call server to the device during an emergency call session, which is separate from the tracking session, in response to the indication message of the emergency condition at the device transmitted to the emergency call server. In some embodiments, the indication message may have included such data as the device's capabilities, the emergency type, and other information based on which the determination to establish the tracking session may be made. As noted, in some embodiments, the device is configured to operate during the tracking session in a reduced-power tracking mode state in which power to sub-systems of the device not required for collecting and communicating the tracking session data associated with the device is reduced, and in which one or more sensor or communication sub-systems of the device, configured to perform collection and communication of the tracking session data, operate at least partially while the device is in the reduced-power tracking mode state. In some embodiments, the indication message of the emergency condition at the device (transmitted to the emergency call server) may include, for example, an initiating message from the device regarding the emergency condition, a reply message from the device responsive to a polling message from the emergency call server, or a reporting message from another device to report the emergency condition at the device.

Once the request message has been received by the at least one server, the at least one server sends 520 a reply (e.g., the message 340 of FIG. 3) to the device to establish the tracking session. As noted, the tracking session is different from the emergency call session, and thus generally requires establishment of communication links different from those that were established between the device and the emergency call server. In some embodiments, sending the reply to the device may include sending the reply with data indicating a maximum periodicity value used for determining the one or more wake-up time instances, subsequent to the first time instance, and with data representative of data parameters to include with the tracking session data sent by the device. Other data, included with other fields or portions of the reply to the device may also be included, such as the expected time the tracking session should last until emergency crew arrives.

With a tracking session established, the at least one server periodically receives 530, from the device, the tracking session data collected by the device during the tracking session. The periodically received tracking session data may be received at one or more wake-up time instances (which are subsequent to a first time instance, e.g., when the device has received the reply from the at least one server and the tracking session is established), with those one or more wake-up time instances determined based, at least in part, on power level of a battery of the device. Other factors/data that may be used to determine one or more wake-up time instances (also referred to as transmission times) include the types of data that is to be transmitted, the type of emergency involved, the time elapsed since the emergency call (e.g., to the emergency call server) was made, the expected time of emergency crew arrival, connectivity bandwidth, etc. In some embodiments, the procedure 500 may further include determining a position of the device based, at least in part, on location-determination data (e.g., signal measurements collected by the device, inertial sensor measurements) included in the received tracking session data. The location-determination data received during the tracking session may also be used to update an initial position approximation derived, for example, during the emergency call session. Updating of the initial position approximation may be performed, in some embodiments, using a Kalman filter, a particle filter, or other location estimation techniques. In some embodiments, the procedure 500 may also include processing (at least some) of the received tracking session data (e.g., to determine position of the mobile device, determine physical condition of a user, format and arrange the received data, etc.), and transmit at least some of the resulting processed data to one or more devices associated with one or more emergency service providers. For example, the processing may include real-time processing applied to the received data (e.g., to filter irrelevant data, update status of the person in distress, etc.) that may be forwarded to wireless devices of police and ambulance crews that may have been dispatched to handle/attend the emergency condition. The processing may also include off-line processing, including deriving emergency resolution statistics, performing insurance-risk analysis, etc.

Figure 6:
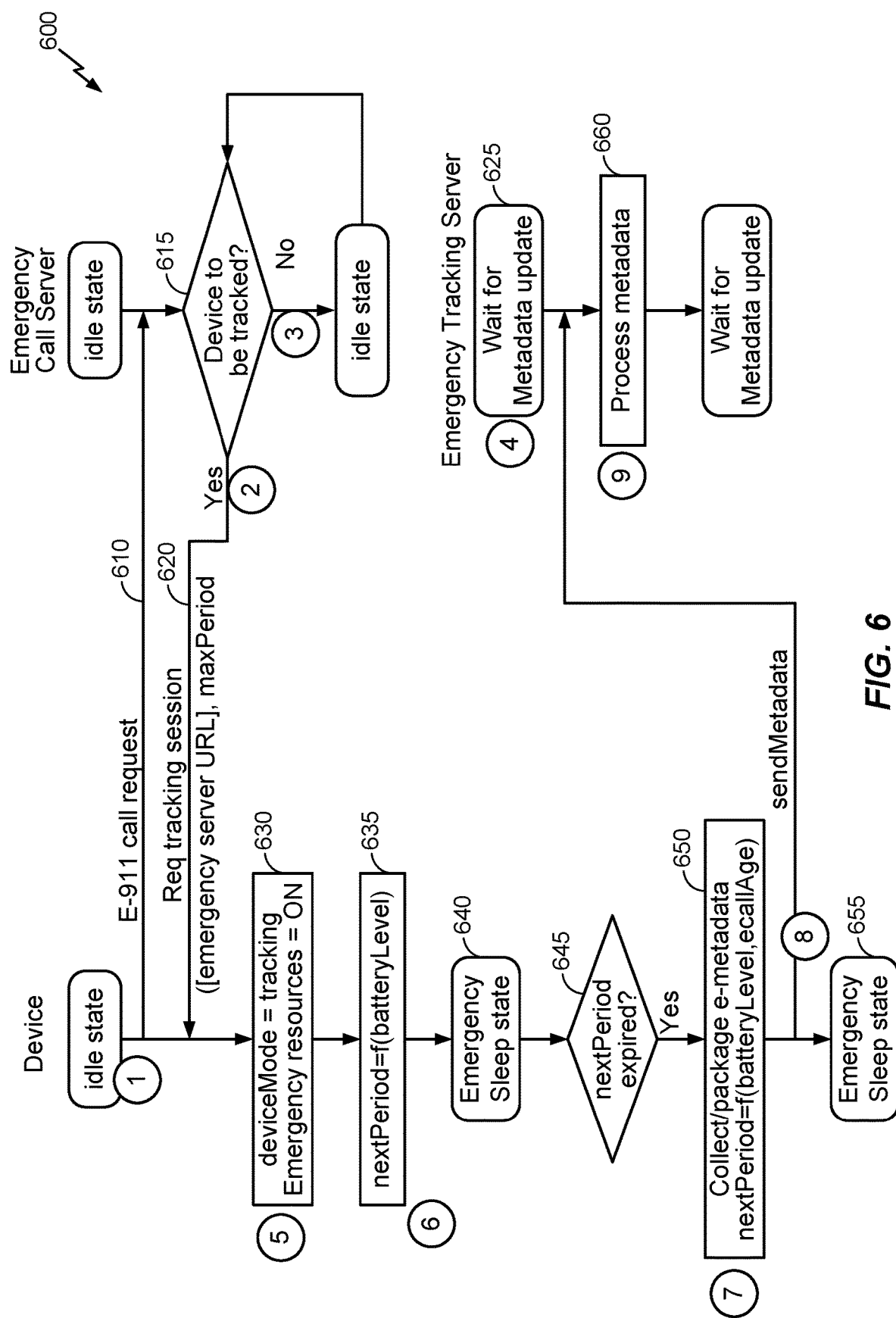
FIG. 6 is flowchart of an example procedure illustrating system-wide operations and interactions between a device, an emergency call server, and an emergency tracking server to facilitate collection and communication of emergency data.

With reference now to FIG. 6, flowchart of an example procedure 600 that illustrates system-wide operations and interactions between a device (e.g., a wireless mobile device for personal use, a wireless device installed in a car or a plane, a stationary device, etc.), an emergency call server, and an emergency tracking server to facilitate collection and communication of emergency data is shown. As illustrated, the procedure 600 begins, in some embodiments, with a mobile device, such as the device 108 or 302 of FIGS. 1 and 3, sending 610 an indication of an emergency condition (e.g., an E-911 message) to an emergency call server. The indication may be sent directly to the emergency call server (e.g., a P SAP), or via one or more intermediary nodes, and may be sent at the direct initiative of the device or in reply to, for example, a message (e.g., a broadcast message) from the emergency call server. In some embodiments, the indication of the emergency condition may have been sent by a third-party's device (e.g., mobile phone of a witness to an emergency) to report the occurrence of an emergency involving another person whose device is to be placed into tracking mode. Although the device of FIG. 6 is depicted as being in idle state, the device may be performing one or more tasks unrelated to the emergency situation.

In response to receiving the indication of the emergency condition, the emergency call server (also depicted as being in idle state, but may be performing one or more tasks), the emergency call server determines 615 whether the device is to be tracked. As described herein, this determination may be based, among other things, on information included in the indication of the emergency condition received from the device, including device capabilities information (e.g., types of transceivers, sensors, communication protocols the device has or supports, which are indicative of whether the device has the communication and data collection resources to support a tracking session), the type of emergency, current location of the device, etc. If it is determined that a tracking session is not to be performed (e.g., because the device's resources are insufficient to support a session, because a live operator determined it is not necessary or practical to conduct a tracking session, etc.), the emergency call session is not initiated (and the emergency call server may return to an idle state or to some other state to perform tasks such as serving another indication of an emergency condition from another device). If, on the other hand, it is determined, at 615, that a tracking session is to be performed, the emergency call server sends 620 (also denoted '2' in FIG. 6) to the device a triggering message (also referred to as a request tracking session message, which may be similar to the message 320 of FIG. 3) with data indicating one or more emergency tracking servers with which the device is to establish a tracking session(s). The one or more tracking servers may be identified (e.g., based on location data provided by the target device, the device capabilities, etc.) through URL's, various other forms of network addressing, other types of network identifiers, and so on. The triggering message sent at 620 may include additional data (arranged in additional fields or message portions), such as an indication of the maximum periodicity to be used during the tracking session's emergency data transmissions. In situations in which the indication of the emergency condition was transmitted from a third-party's device, it may be necessary to require the target device (that is to send tracking session data) to enter a mandatory tracking session (e.g., if the target's device user has become unconscious). In that case, the triggering message may be a mandatory tracking session command that cannot be overridden by the target device or by its user (or any other person).

As further illustrated in FIG. 6, the specified emergency tracking server (or multiple servers, if more than one is specified) is waiting, prior to establishment of a tracking session between itself and the device, for emergency data updates (from the device of the present example, and/or from other devices it is serving to facilitate handling of emergency situations), as indicated in block 625 (also denoted '4' in FIG. 6). When the device receives from the emergency call server the triggering message, the device may enter, at 630 (denoted '5' in FIG. 6), a tracking mode, thus initiating a tracking session. The tracking session is a separate session (and may be independent of) the emergency call session between the device and the emergency call server. The mobile device may be configured, upon initiation of the tracking session, to inform its essential subsystems (emergency resources) to stay awake, even if device is turned off (i.e., locking the device into a tracking mode even if device is turned off by user). The device may also be configured to turn sensors' data collection on, and to collect emergency data (also referred to as tracking session data, or e-metadata) to send to tracking servers. In addition, the application processor sub-system cleanup process is executed, with background applications and non-essential sub-systems (e.g., the application processor, the video processor, etc.) and activities (e.g., e-mail activities, social networks) being turned off, or have their functionality limited/reduced.

As described herein, the device may be configured (prior to sending a request to the emergency tracking server or receiving a reply therefrom) to set the wake-up timer and to thus determine (at 635, also denoted '6' in FIG. 6) one or more subsequent wake-up time instances at which data collected since the last transmission of emergency data is communicated to the emergency tracking session. Determination of the one or more subsequent wake-up time instances may be a function of the battery level of the device, but may also be based on such factors as the time elapsed since the emergency message was sent (i.e., at 610 of FIG. 6), the types and volume/amount of data that needs to be sent to the emergency tracking server (the data parameters may be determined and specified, in some embodiments, by the emergency tracking server), data novelty across data collections, maximum periodicity value (provided, for example, by the emergency call server or the emergency tracking server), connectivity bandwidth, etc. In some embodiments, the device is configured to slip into an emergency state upon setting the wake-up timer, and to wait for the emergency data to be collected (e.g., at 640).

In some embodiments, the sensor and communication sub-systems (including transceivers and other modules that receive and measure radio signals, internal sensors such as inertial sensors, and external sensors, such as biometric sensors and vehicle-based sensors) may be placed in a power state that allows them collect data during the interval preceding the next wake-up period (such a state may be referred to as reduced-power tracking mode state). Alternatively and/or additionally, in some embodiments, collection of data may be performed when the essential sub-systems (e.g., sensors sub-systems, communication and modem sub-systems) are awaken. Upon a determination, at 645, that the determined wake-up time has been reached, emergency data (tracking session data) is collected (or has been collected in the interval between the last emergency data transmission and the current transmission that is about to take place), as shown at 650 of FIG. 6 (also denoted '7'), from the device's sub-systems (e.g., sensor sub-system, connectivity/communication sub-system, external sensors (e.g., wearable sensors such as biometric sensors), etc.) The emergency/tracking-session data collected is packed, or otherwise arranged, into messages (generated according to various possible messaging/communication protocols, such as SIP, LPP, HTTPS, UMTS, etc.) In some embodiments, the device may also compute the next wake-up time (the next subsequent time instance) at which the next transmission of emergency data is to be made, with the computation of the next wake-up time being based, for example, on the current battery level, time elapsed since the emergency call was made, the particular data that needs to be transmitted, connectivity bandwidth, and/or other factors. As noted, in some embodiments, the device may have computed several wake-up times at a particular time instance, and thus the device may not need to compute at 650 the next wake-up time.

The device may be configured next to transmit 655 (also denoted '8' in FIG. 6) to the emergency tracking server (with which it may previously have established a tracking session, separate from the emergency tracking session). The emergency tracking server is configured to process 660 (also denoted '9' in FIG. 6) the emergency data received from the device. For example, as described herein, the current location approximation of the device may be determined based on location-determination data included in the emergency data (e.g., inertial sensor data, signal and/or timing measurements for radio signals detected by the device's various transceivers, etc.), vital-signs data may be determined based on measurements included with the emergency data, irrelevant data and/or outliers may be filtered out or removed, and so on. Processed data and/or raw data may be arranged into data frames or packets and communicated to one or more devices associated with one or more emergency service providers (e.g., a police patrol car, an ambulance crew, etc.) The emergency tracking server may also send data to various databases and expert systems (e.g., experts systems compiling statistics, such as emergency resolution statistics, expert systems to perform insurance risk analysis, etc.)

Figure 7:
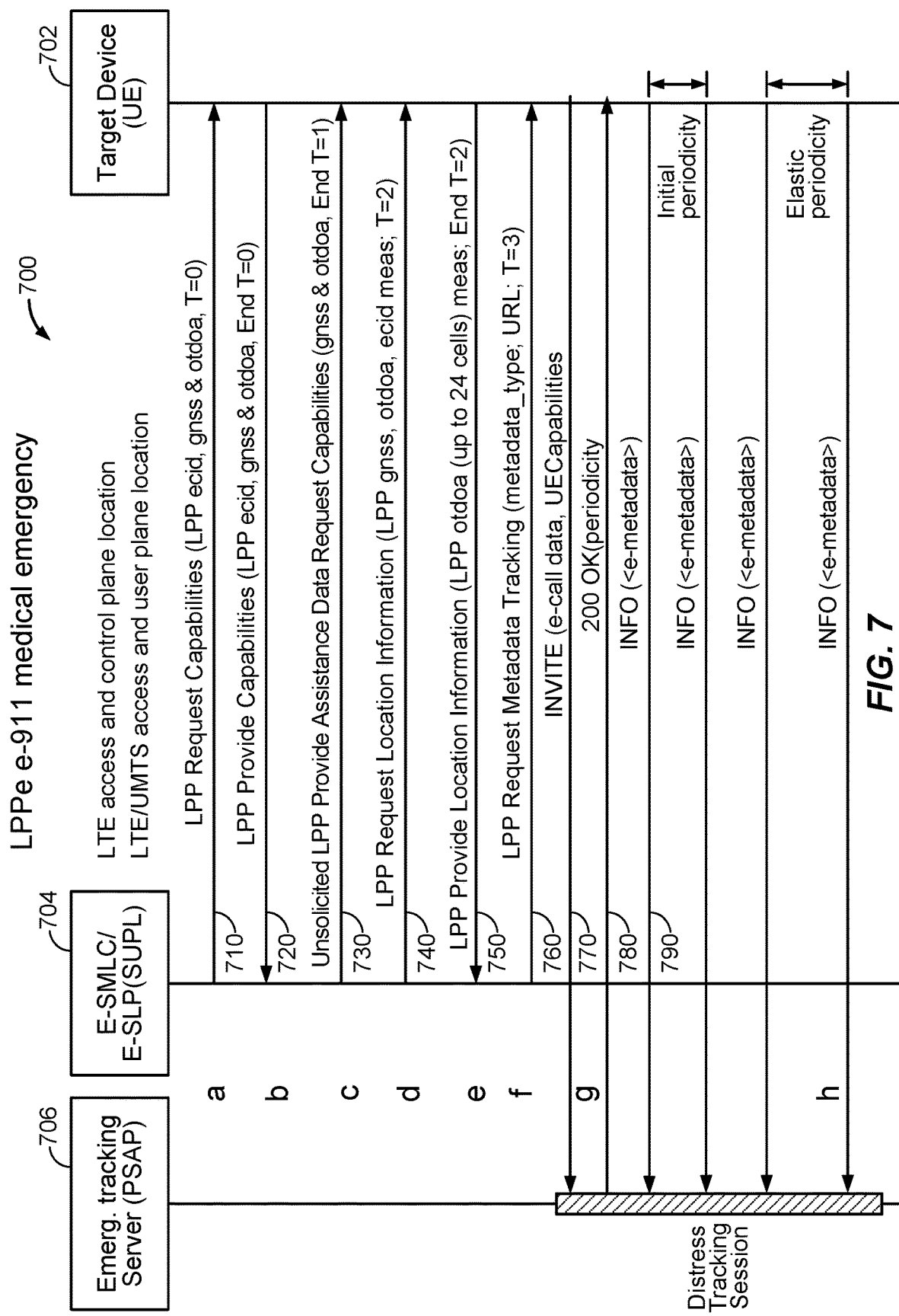
FIG. 7 is a flow diagram of an example process for reporting a medical emergency and establishing a tracking session to communicate emergency medical data.
Figure 8:
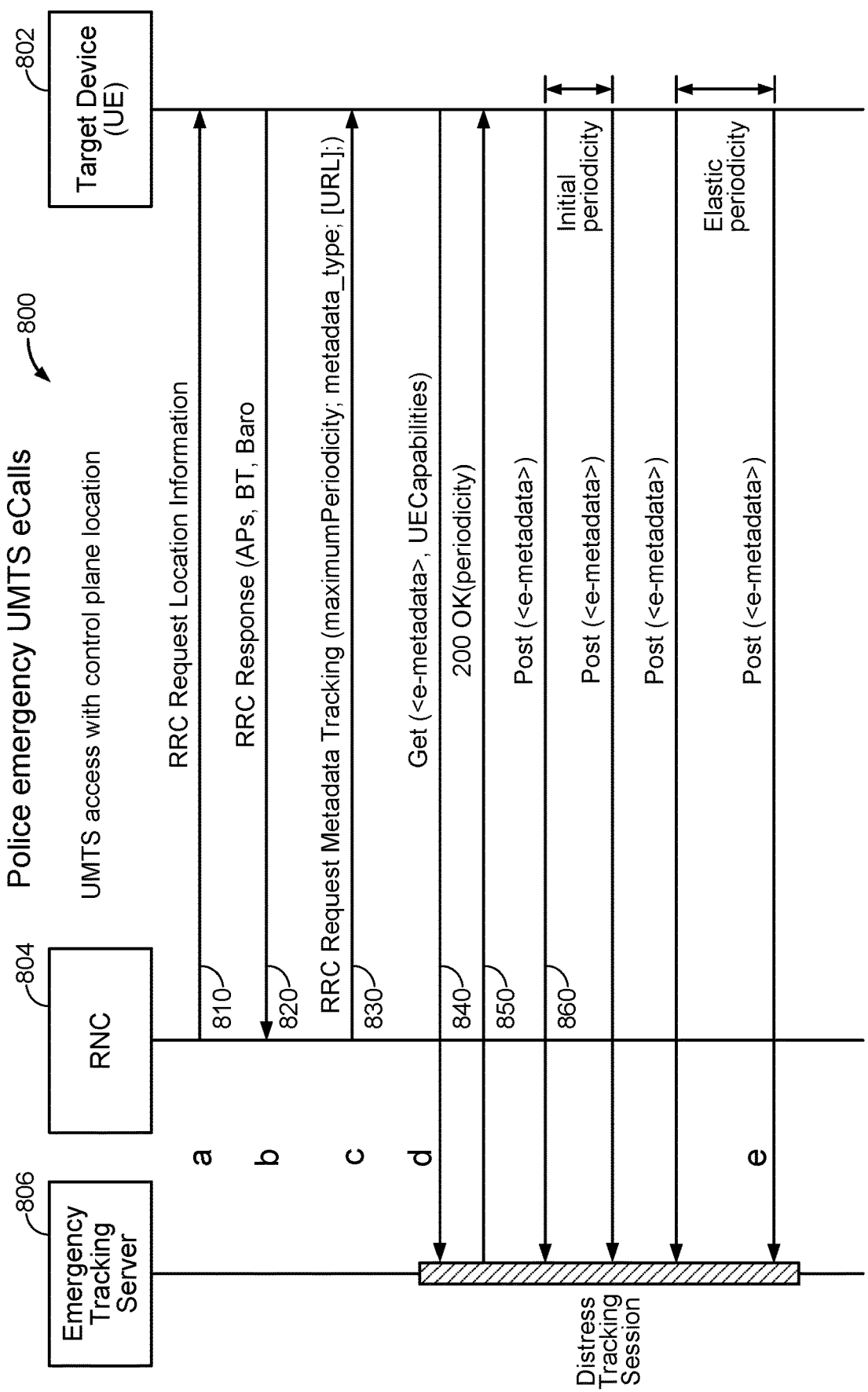
FIG. 8 is a flow diagram of another example process for reporting a police emergency and establishing a tracking session to communicate emergency criminal/forensics data.
Figure 9:
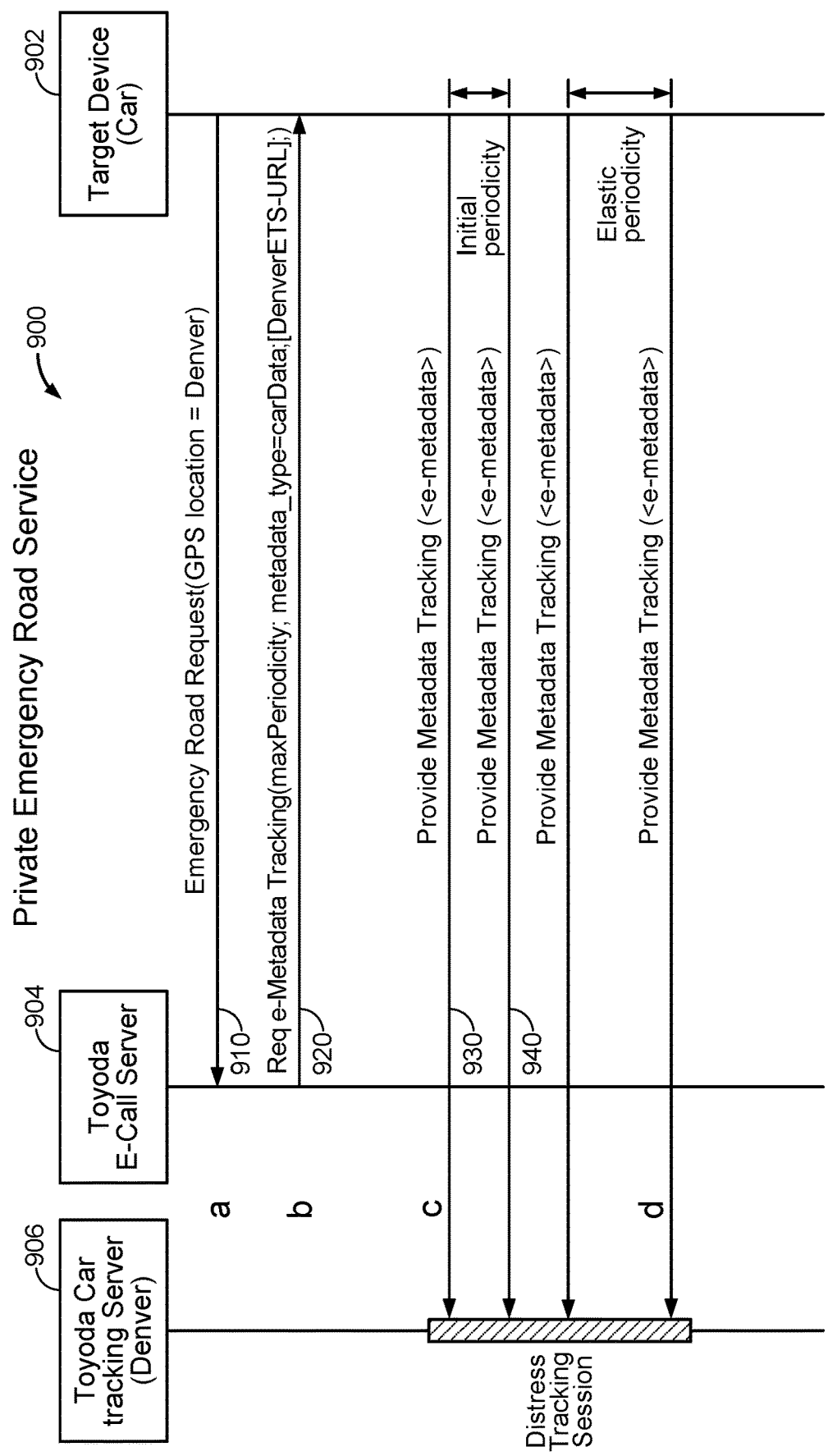
FIG. 9 is a flow diagram of another example process for reporting a private road-side emergency and establishing a tracking session to communicate emergency vehicle/accident data.

Additional details regarding the implementations described herein are provided with respect to FIGS. 7-9, showing additional example embodiments. Particularly, with reference to FIG. 7, a flow diagram of an example process 700 for reporting a medical emergency and establishing a tracking session to communicate emergency data is shown. In the embodiments of FIG. 7, the example process of handling a medical emergency is based on an e-911 call flow that is realized, at least in part, using a long-term evolution (LTE) positioning protocol (LPP). Thus, for example, a location server 704, such as an Evolved Serving Mobile Location Center (E-SMLC)/E-SLP(SUPL), may send to a target mobile device/UE 702 (e.g., in response to an earlier communication from the target device 702 to the server 704, or to another server, to advise on an emergency condition) an LPP request capabilities message 710. In some embodiments, the server may have initiated communication with the target device 702 as part of a general process of surveying/polling devices within its range e.g., to periodically communicate (e.g., via broadcast messages) with user devices (which may be personal devices, wireless devices affixed to vehicles, etc.) to cause a determination of whether one or more of those devices require emergency response services (in such embodiments, the target devices may be configured to decline the communications, e.g., if there is no emergency, or to respond with a reply providing the requested information). In some embodiments, the server may have sent the message 710 in response to receiving an indication of an emergency condition from some other device (different from the device 702) that reported an emergency condition involving the device 702.

In response to the LPP request capabilities message 710, the target device 702, which may be similar in configuration and/or functionality to the devices 108 or 302 of FIGS. 1 and 3, transmits to the server 704 an LPP Provide Capabilities message 720, which includes data regarding the capabilities of the target device. As noted, in some embodiments, if the message 710 was sent at the initiative of the server, the device 702 may decline the request (e.g., if there is no emergency). If the device sends the message 720, subsequently, the server 704 transmits to the device 702 an Unsolicited LPP Provide Assistance Data Request Capabilities message 730 and an LPP Request Location Information 740, in response to which the target device 702 sends an LPP Provide Location Information message 750, with data indicative of the device's location (e.g., best known position). Based on the information, including the device capabilities information (provided with the message 720) it has received from the target device, information provided in the initial indication of the emergency condition (which may have been received with or prior to the message with the device capabilities, with that indication message being received from the device 702 or from a different device), etc., the server 704 may determine whether a tracking session between the target device and an emergency tracking server is to be established. The identity of the emergency tracking server(s) that is to receive periodical emergency/tracking-session data may be based, for example, on location information provided by the target device (e.g., in the message 750), the type of emergency reported by the device, the device's capabilities, and/or further location-determination processing performed by the server 704. If the server 704 determines that a tracking session is to be established (e.g., the device capabilities information indicates that the target device has the resources to support a tracking session), the server 704 sends to the target device 702 an LPP Request Metadata Tracking message 760, which includes the URL of the emergency tracking server(s) to which emergency data is to be sent (alternatively, other information identifying the network addresses or identities of the emergency tracking servers (e.g., IP addresses) may be included in the message 760).

In the example of FIG. 7, upon receipt of the LPP Request Metadata Tracking message 760, the target device 702 establishes a tracking session (separate from the session it used to communicate with the server 704) with the emergency tracking server identified in the message 760. For example, the target device 702 sends an Invite message 770 to the emergency tracking server 706 (which may be a PSAP server), and the server 706 responds with, for example, an OK message 780, which may include, for example, a maximum periodicity value (and may include other types of information/parameters, such as the emergency data types that the target device is to send to the server 706). The other operations illustrated in FIG. 7 may be similar to those described in relation to FIG. 3, where the target device determines wake-up times (in order to realize elastic periodicity for sending emergency data, such periodicity being a function of at least the battery level of the device), enters emergency power mode (to preserve power), and periodically sends emergency data (tracking-session data, or metadata), such as the message 790, collected prior to respective transmissions. The periodic emergency data may be sent to the emergency tracking server using, in some embodiments, SIP messages, or using other message types (e.g., LPP messages, HTTPS message, etc.) In some embodiments, the periodic emergency data provided by the device 702 may include, for example, location information, such as device location, cell ID information, access point information (e.g., MAC address, RSSI/RTT information), barometer information, etc. The emergency data transmitted by the target device 702 may also include medical use information, which may have been communicated to the device 702 from wearable devices or sensors (e.g., via Bluetooth® wireless technology links or other types of near-field links, or via LAN links), including pulse/heart rate information, body temperature, blood pressure, oxygen saturation level, etc. In some embodiments, the emergency tracking server may be configured to update user location, relay vital signs to emergency crews, and/or feed distress call records into expert systems and databases (e.g., to maintain global statistics of emergencies, to perform cause and risk analysis, etc.)

Turning next to FIG. 8, a flow diagram of an example process 800 for reporting a police emergency and establishing a tracking session to communicate emergency data is shown. In the example of FIG. 8, reporting and tracking of a police-type emergency is performed using UMTS eCall. As illustrated, an emergency call server, implemented using a radio network controller (RNC) 804, sends an RRC Request Location Information message 810 to a target device 802 (which may be similar in configuration and/or functionality to any of the devices 108, 302, and 702 described herein). In some embodiments, the RNC 804 may independently, i.e., at its own initiative, send the message 810 to the device 802 (e.g., as part of a general process to survey/poll devices within its range for location information, information about whether there is an emergency, etc.) In such embodiments, the target device being contacted may be configured to determine whether to accept and reply to the request message, or to decline the communication (e.g., if there is no emergency). As noted, in some embodiments, a message initially sent by the RNC (or some other such emergency call server) may be configured to cause the receiving device to respond to the request message in some manner (for example, to enter a tracking session with some designated emergency tracking server) without the device or its user being able to exercise discretion. Such embodiments may include situations where the user may not be able to accept or acknowledge a request message (e.g., if the user is unconscious or is otherwise unable to respond), when the receiving device's user is engaged in some criminal activity and thus does not wish to be tracked, etc. In some embodiments, the message 810 may have been sent in response to an initiating emergency communication message (e.g., indicating the emergency type, device capabilities, location information, etc.) from the device 802, or in response to an initiating message from some other device or node reporting the emergency condition.

In response to the message 810, the target device 802 sends an RRC Response message 820, which may include location information (e.g., identity of access points in communication with the target device 802), data collected by the device's various sensors, such as barometer measurements, etc.) Next, the RNC 804 may determine whether a tracking session should be established (e.g., based on information received in preceding message, including the message with the indication of the emergency condition), and if so, it sends an RRC Request Metadata Tracking message 830 to the target device 802, which may include data to provide, for example, the maximum periodicity, the type of emergency data to be sent during the tracking session, the URL of the emergency tracking server (or some other type of addressing or identification information therefor), etc.

Upon receipt of the RRC Request Metadata Tracking message 830, the target device 802 establishes a tracking session with the emergency tracking server identified in the message 830. For example, the target device 802 sends a Get message 840, which in the example of FIG. 8 includes some emergency data, and device capabilities data. In response to the message 840, the emergency tracking server 806 sends an OK message 850 (which may include such information as the periodicity for communicating emergency data, and may include other types of information/parameters, such as the emergency data types that the target device is to send to the server 806). The other operations illustrated in FIG. 8 may be similar to those described in relation to FIGS. 3 and 7, in which the target device determines wake-up times (in order to realize elastic periodicity for sending emergency data, such periodicity being a function of at least the battery level of the device), enters reduced-power tracking mode state (to preserve power), and periodically sends emergency data (tracking-session data, or metadata), such as the POST message 860, collected prior to respective transmissions. The periodic emergency data may be sent to the emergency tracking server using, in some embodiments, HTTPS messages, or using other message types (e.g., SIP messages, LPP messages, etc.) In some embodiments, the periodic emergency data provided by the device 802 may include, for example, location information, such as device location, cell ID information, access point information (e.g., MAC address, RSSI/RTT information), barometer information, etc. The emergency data transmitted by the target device 802 may also include police use information, such as navigation-type information (provided through measurements performed by the target device's various inertial sensors), fingerprint information (e.g., obtained via a touch-screen of the device, or fingerprint readers), photo samples (obtained via the device's camera), etc. In some embodiments, the emergency tracking server 806 may be configured to update user location, estimate user navigation (e.g., heading information, body position), identify the device's handler or identify a third party who is the subject of any photos taken (e.g., a suspect), relay vital signs to emergency crews, and/or feed distress call records into expert systems and databases (e.g., to maintain global statistics of emergencies).

With reference to FIG. 9, a flow diagram of an example process 900 for reporting a private road-side emergency and establishing a tracking session to communicate emergency data is shown. The process 900 begins with the target device 902 (e.g., a mobile device of a driver, or a vehicle-dedicated wireless device), sends an indication of an emergency condition as an Emergency Road Request message 910. As discussed herein, the indication of the emergency condition may have been transmitted from a device different from the device 902 (e.g., a device that is merely reporting the emergency condition at the device 902). Alternatively, the message 910 may have been sent (by the device 902 or some other device) in response to an initiating message from the server 904. The message 910 may include location data such as, for example, a location determined based on a GPS-type system, or a location determined based on terrestrial access points. In some embodiments, the message 910 may include other types of location-based information, such as a coarse position (e.g., expressed as the identity of an access point or base station with which the device 902 is communicating, or as a set of signal measurements of signals received from local access points). The message 910 may also include other types of information, such as the emergency type (e.g., road-side problem, optionally identifying specific problems such as engine problems, flat tire, or something else), and device capabilities data. The message 910 may be configured according to one of various possible messaging protocols, including SIP, LPP, UMTS, HTTPS, etc. The message 910 is directed to an emergency call server 904, which may be similar, in configuration and/or functionality, to any of the servers 120, 304, 704, or 804 discusses in relation to FIGS. 1, 3, 7, and 8. The data included in the message 910 may be split and transmitted in multiple different messages. The server 904 may then determine if a tracking session for the target device 902 is to be established, e.g., based on the capabilities of the target device, on the location of the device (which may indicate if there is an emergency tracking server within range of the target device), etc. If it is determined that a tracking session is to be established, a triggering message, such as a Req e-Metadata Tracking message 920, is sent from the server 904 to the target device 902 to trigger a tracking session that is separate (e.g., different and/or independent) from the session through which the target device 902 and the server 904 have been communicating. The message 920 may include, for example, an indication of the maximum periodicity, the types of emergency data to be tracked, and the URL for the emergency tracking server (or some other network addressing information, or server identification information). The particular emergency tracking server used may be selected based on location data, device capabilities data, etc., included with the Emergency Road Request message 910 sent to the server 904.

In the example of FIG. 9, establishment of the session may be achieved by simply sending the first transmission of emergency data, in this case through a Provide Metadata Tracking message 930, to the destination emergency tracking server 906. However, in some embodiments, a message exchange to request, and then be granted, establishment of a tracking session may be implemented. Additional operations performed by the target device 902 may be similar to those described in relation to FIGS. 3, 7, and 8, where the target device may determine one or more wake-up times (in order to realize elastic periodicity for sending emergency data, such periodicity being a function of at least the battery level of the device), enters emergency power mode (e.g., reduced-power tracking mode state in order to preserve power), and periodically sends emergency data (tracking-session data, or metadata), such as the messages 930 or 940. The periodic emergency data may be sent to the emergency tracking server 906 using one or more of various message configurations and protocols, including SIP, LPP, HTTPS, UMTS, or using other message protocols/types. In some embodiments, the periodic emergency data provided by the device 902 may include, for example, location information, such as device location, cell ID information, access point information (e.g., MAC address, RSSI/RTT information), barometer information, etc. The emergency data transmitted by the target device 902 may also include road-side (car assistance) use information, such as navigation-type information (provided through measurements performed by the target device's various inertial sensors), car sensor information (car battery level, engine temperature, gas and oil levels, tire pressure, etc.), and other germane information. In some embodiments, the emergency tracking server 906 may be configured to update user location, estimate user navigation (e.g., heading information, body position), relay relevant vehicle information to the emergency crew dispatched to handle to road-side emergency, and/or feed distress call data (raw or processed data) into expert systems and databases (e.g., to maintain global statistics of emergencies).

Figure 10:
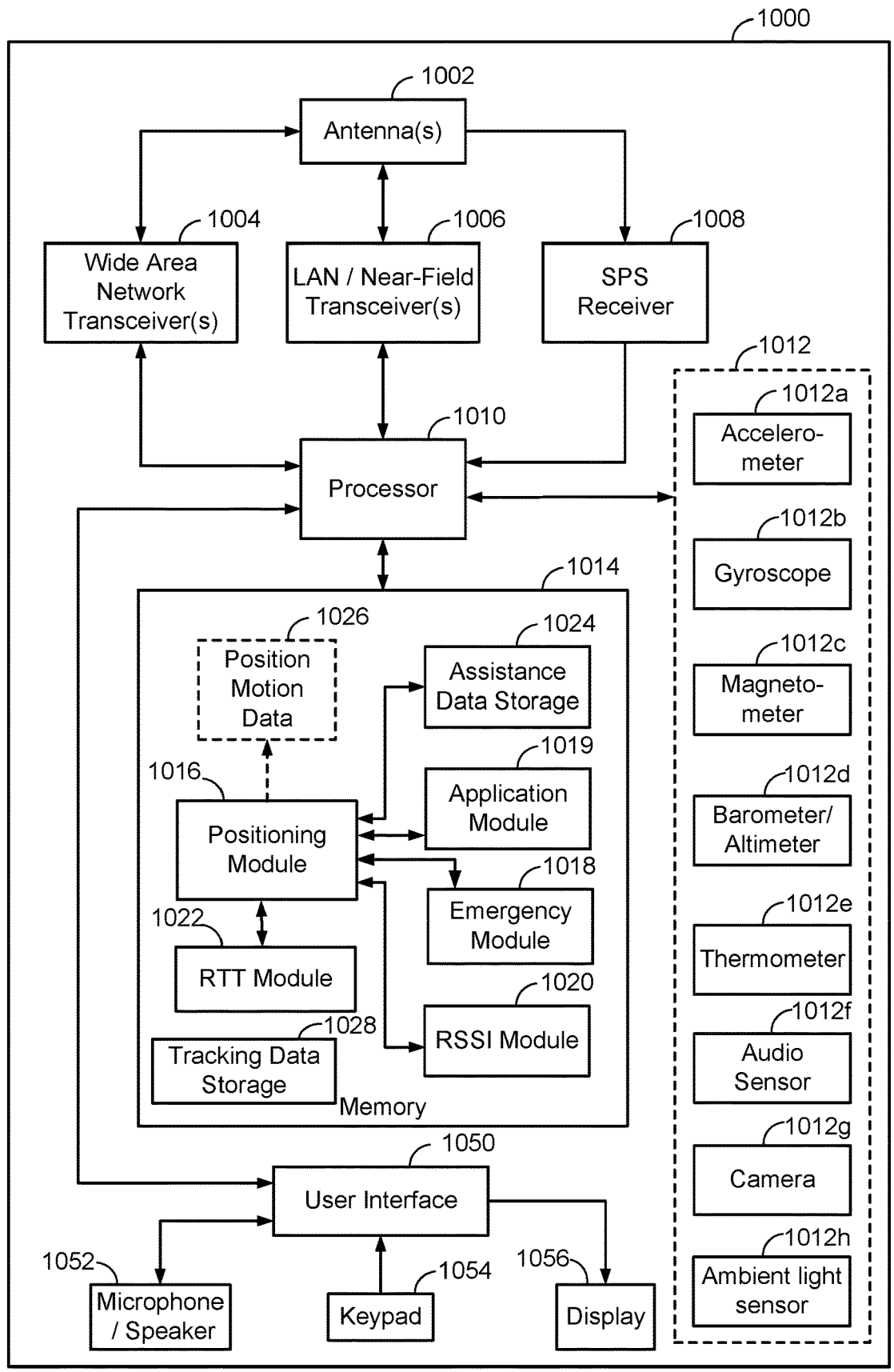
FIG. 10 is a schematic diagram of an example wireless device (e.g., a mobile wireless device).

With reference now to FIG. 10, a schematic diagram illustrating various components of an example wireless device 1000 (e.g., a mobile device), which may be similar, in configuration and/or functionality, to the devices 108, 302, 702, 802, and 902 depicted in FIGS. 1, 3, and 7-9 is shown. For the sake of simplicity, the various features/components/functions illustrated in the schematic boxes of FIG. 10 are connected together using a common bus to represent that these various features/components/functions are operatively coupled together. Other connections, mechanisms, features, functions, or the like, may be provided and adapted as necessary to operatively couple and configure a wireless device. Furthermore, one or more of the features or functions illustrated in the example of FIG. 10 may be further subdivided, or two or more of the features or functions illustrated in FIG. 10 may be combined. Additionally, one or more of the features or functions illustrated in FIG. 10 may be excluded. In some embodiments, some or all of the components depicted in FIG. 10 may also be used in implementations of one or more of the nodes/devices 106*a-e* and/or 104*a-c*, and/or the servers 120 and 122 illustrated in FIG. 1, as well as the servers 304, 306, 704, 706, 804, 806, 904, and 906 shown in FIGS. 3 and 7-9. In such embodiments, the components depicted in FIG. 10 may be configured to cause the operations performed by devices (wireless devices, servers, such as emergency call and tracking servers, etc.) as described herein with respect to, for example, FIGS. 2-9 (e.g., to send emergency messages, determine whether to establish a tracking session, and/or periodically communicate emergency/tracking-session data if such a tracking session is established).

As shown, the wireless device 1000 may include one or more local area network/near-field transceivers 1006 that may be connected to one or more antennas 1002. The one or more local area network/near-field transceivers 1006 comprise suitable devices, circuits, hardware, and/or software for communicating with and/or detecting signals to/from one or more of the WLAN access points 106*a-e* depicted in FIG. 1, and/or directly with other wireless devices (e.g., mobile devices) within a network. The transceivers 1006 may also be configured to communicate with near-by devices (e.g., wearable biometric sensors, vehicle-sensors) via such near-field communication technologies as Bluetooth® wireless technology, or via LAN communication links. In some embodiments, the local area network/near-field transceiver(s) 1006 may comprise a WiFi (802.11x) communication transceiver suitable for communicating with one or more wireless access points; however, in some embodiments, the local area network/near-field transceiver(s) 1006 may be configured to communicate with other types of local area networks, personal area networks, etc. Additionally, any other type of wireless networking technologies may be used, for example, Ultra Wide Band, ZigBee, wireless USB, etc.

The wireless device 1000 may also include, in some implementations, one or more wide area network transceiver(s) 1004 that may be connected to the one or more antennas 1002 (or may be connected to dedicated antennas for WAN-type transceivers). The wide area network transceiver 1004 may comprise suitable devices, circuits, hardware, and/or software for communicating with and/or detecting signals from one or more of, for example, the WWAN access points 104*a-c* illustrated in FIG. 1, and/or directly with other wireless devices within a network (including with servers such as the servers 120, 122, 304, 306, 704, 706, 804, 806, 904, and 906 described herein). In some implementations, the wide area network transceiver(s) 1004 may comprise a CDMA communication system suitable for communicating with a CDMA network of wireless base stations. In some implementations, the wireless communication system may comprise other types of cellular telephony networks, such as, for example, TDMA, GSM, WCDMA, LTE, etc. Additionally, any other type of wireless networking technologies may be used, including, for example, WiMax (802.16), etc.

In some embodiments, an SPS receiver (also referred to as a global navigation satellite system (GNSS) receiver) 1008 may also be included with the wireless device 1000. The SPS receiver 1008 may be connected to the one or more antennas 1002 (or may be connected to its own dedicated antenna(s)) for receiving satellite signals. The SPS receiver 1008 may comprise any suitable hardware and/or software for receiving and processing SPS signals. The SPS receiver 1008 may request information as appropriate from the other systems, and may perform the computations necessary to determine the position of the device 1000 using, in part, measurements obtained by any suitable SPS procedure. Additionally, measurement values for received satellite signals may be communicated to a location server configured to facilitate location determination.

As further illustrated in FIG. 10, the example wireless device 1000 includes one or more sensors 1012 coupled to a processor/controller 1010. For example, the sensors 1012 may include motion sensors (also referred to as inertial, orientation, or navigation sensors) to provide relative movement and/or orientation information (which is independent of motion data derived from signals received by the wide area network transceiver(s) 1004, the local area network transceiver(s) 1006, and/or the SPS receiver 1008). By way of example but not limitation, the motion sensors may include an accelerometer 1012*a*, a gyroscope 1012*b*, and a geomagnetic (magnetometer) sensor 1012*c* (e.g., a compass), any of which may be implemented based on micro-electro-mechanical-system (MEMS), or based on some other technology. The one or more sensors 1012 may further include an altimeter (e.g., a barometric pressure altimeter) 1012*d*, a thermometer (e.g., a thermistor) 1012*e*, an audio sensor 1012*f* (e.g., a microphone) and/or other sensors (such as a humidity sensor, proximity sensor, not shown). The output of the one or more sensors 1012 may be provided as data transmitted to a remote device or server (via the transceivers 1004 and/or 1006, or via some network port or interface of the device 1000) for storage or further processing. As further shown in FIG. 10, in some embodiments, the one or more sensors 1012 may also include a camera 1012*g* (e.g., a charge-couple device (CCD)-type camera, a CMOS-based image sensor, etc.), which may produce still or moving images (e.g., a video sequence) that may be displayed on a user interface device, such as a display or a screen, and that may be further used to determine an ambient level of illumination and/or information related to colors and existence and levels of UV and/or infra-red illumination. In some embodiments, the one or more sensors 1012 may further include a separate ambient light sensor (ALS) 1012*h* configured, for example, to sense or detect changes in light. Alternatively and/or additionally, the one or more sensors may include a proximity sensor (which may be the same as, or different from, the ALS 1012*h*) implemented, for example, using a photon sensor, a solar cell, etc.

The processor(s) (also referred to as a controller) 1010 may be connected to the local area network transceiver(s) 1006, the wide area network transceiver(s) 1004, the SPS receiver 1008 and the one or more sensors 1012. The processor may include one or more microprocessors, microcontrollers, and/or digital signal processors that provide processing functions, as well as other calculation and control functionality. The processor 1010 may be coupled to storage media (e.g., memory) 1014 for storing data and software instructions for executing programmed functionality within the device 1000. The memory 1014 may be on-board the processor 1010 (e.g., within the same IC package), and/or the memory may be external memory to the processor and functionally coupled over a data bus. Further details regarding an example embodiment of a processor or computation system, which may be similar to the processor 1010, are provided below in relation to FIG. 12.

A number of software modules and data tables may reside in memory 1014 and may be utilized by the processor 1010 in order to manage communications with remote devices/nodes (such as the various nodes and/or the servers 120 or 122 depicted in FIG. 1, or any of the emergency call and tracking servers depicted in FIGS. 3 and 7-9), including to communicate with emergency call and tracking servers in the manner described herein, perform positioning determination functionality, and/or perform device control functionality. As illustrated in FIG. 10, in some embodiments, the memory 1014 may include a positioning module 1016, an emergency module 1018, a received signal strength indicator (RSSI) module 1020, and/or a round trip time (RTT) module 1022. It is to be noted that the functionality of the modules and/or data structures may be combined, separated, and/or be structured in different ways depending upon the implementation of the mobile device 1000. For example, the RSSI module 1020 and/or the RTT module 1022 may each be realized, at least partially, as a hardware-based implementation, and may thus include such devices or circuits as a dedicated antenna (e.g., a dedicated RTT and/or an RSSI antenna), a dedicated processing unit to process and analyze signals received and/or transmitted via the antenna(s) (e.g., to determine signal strength of received signals, determine timing information in relation to an RTT cycle, etc.)

The emergency module 1018 may include an application to implement processes to communicate an emergency condition indication, establish a tracking session (separate from an emergency call session established with a server to communicate an indication of an emergency condition), and, when a tracking session is established (in response to receipt of a triggering message), periodically communicate emergency data to one or more emergency tracking servers. The emergency module 1018 may further be configured to control power delivery to the modules/sub-systems of the device 1000, including to operate in reduced-power tracking mode state when it is determined that a tracking session is to be established. In the reduced-power tracking mode state, power to non-essential modules/sub-systems (i.e., not essential for collection and communication of tracking session data) is reduced, while the operation of sensor and communication modules/sub-systems to collect and communicate the tracking session data is at least partially maintained. The emergency module 1018 may also be configured to receive and process messages from emergency servers and/or process emergency messages and/or emergency data messages. The emergency module 1018 may also include an application to implement a process which requests position information from the positioning module 1016, or which receives positioning/location data from a remote device (e.g., a remote location server).

The memory 1014 may also include an application module 1019. Applications typically run within an upper layer of the software architectures, and may include indoor navigation applications, shopping applications, location aware service applications, etc. The positioning module/circuit 1016 may derive the position of the wireless device 1000 using information derived from various receivers and modules of the mobile device 1000, e.g., based on measurements performed by the RSSI module and/or the RTT module. Data derived by the positioning module 1016 may be used to supplement location information provided, for example, by a remote device (such as a location server) or may be used in place of location data sent by a remoted device. For example, the positioning module 1016 may determine position of the device 1000 based on measurements performed by various sensors, circuits, and/or modules of the device 1000, and use those measurements in conjunction with assistance data received from a remote server to determine location of the device 1000.

As further illustrated, the wireless device 1000 may also include assistance data storage 1024, where assistance data, such as map information, data records relating to location information in an area where the device is currently located, heatmaps (e.g., indicative of expected signal strength values, for signals transmitted from one or more wireless device, at various locations), etc., is stored. In some embodiments, the wireless device 1000 may also be configured to receive supplemental information that includes auxiliary position and/or motion data which may be determined from other sources (e.g., from the one or more sensors 1012). Such auxiliary position data may be incomplete or noisy, but may be useful as another source of independent information for estimating the position of the device 1000, or for performing other operations or functions. Supplemental information may also include, but not limited to, information that can be derived or based upon Bluetooth® wireless technology signals, beacons, RFID tags, and/or information derived from a map (e.g., receiving coordinates from a digital representation of a geographical map by, for example, a user interacting with a digital map). The supplemental information may optionally be stored in the storage module 1026 schematically depicted in FIG. 10. The wireless device 1000 may additionally include tracking data storage 1028 to store, temporarily or long-term, tracking session data (e-metadata) collected by the wireless device during, for example, a tracking session (established, for example, in response to a request message received from an emergency call server). The tracking session data may include data collected by sensor and communication sub-systems while the wireless device is operating in reduced power mode, and at least some of the data may be periodically transmitted to a remote device (e.g., a remote emergency tracking server) at determined time instances. In some embodiments, tracking session data that has been transmitted to a remote device may be removed from storage to allow new data (e.g., collected subsequent to transmission of the at least some of the tracking session data) to be stored. In some embodiments, data stored in the storage 1028 may be processed (prior to, or after being stored in the storage 1028) to, for example, timestamp the stored data, compress the stored data, compute resultant differential data (representative of changes of tracked data from one time instance to another), encrypt stored data, etc.

The wireless device 1000 may further include a user interface 1050 providing suitable interface systems, such as a microphone/speaker 1052, a keypad 1054, and a display 1056 that allows user interaction with the device 1000. The microphone/speaker 1052 (which may be the same or different from the audio sensor 10120 provides for voice communication services (e.g., using the wide area network transceiver(s) 1004 and/or the local area network/near-field transceiver(s) 1006). The keypad 1054 may comprise suitable buttons for user input. The display 1056 may include a suitable display, such as, for example, a backlit LCD display, and may further include a touch screen display for additional user input modes.

Figure 11:
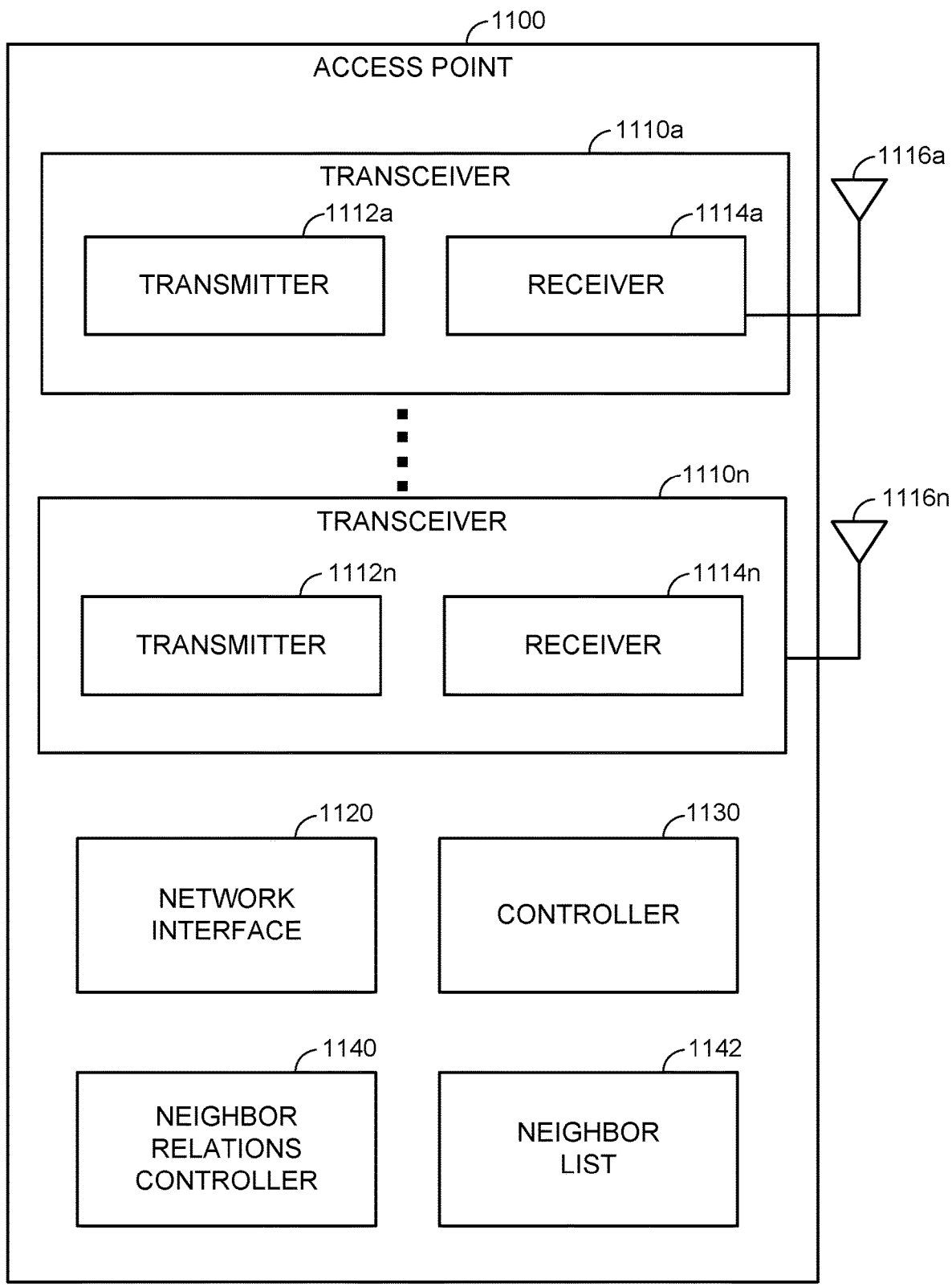
FIG. 11 is a schematic diagram of an example node (e.g., an access point or a server).

With reference now to FIG. 11, a schematic diagram of an example node 1100, such as access point or a server, which may be similar to, and be configured to have a functionality similar to that, of any of the various nodes depicted in FIGS. 1, 3, and 7-9 (e.g., the nodes 104a-c, 106a-e, and/or the servers 120, 122, 304, 306, 704, 706, 804, 806, 904, and 906), is shown. The node 1100 may include one or more transceivers 1110a-n electrically coupled to one or more antennas 1116a-n for communicating with wireless devices, such as, for example, the devices 108, 302, 702, 802, 902, or 1000 of FIGS. 1, 3, and 7-10, respectively. The each of the transceivers 1110a-1110n may include a respective transmitter 1112a-n for sending signals (e.g., downlink messages) and a respective receiver 1114a-n for receiving signals (e.g., uplink messages). The node 1100 may also include a network interface 1120 to communicate with other network nodes (e.g., sending and receiving queries and responses). For example, each network element may be configured to communicate (e.g., wired or wireless communication) with a gateway, or other suitable device of a network, to facilitate communication with one or more network nodes (e.g., any of the other access points or servers shown in FIGS. 1, 3, and 7-9, and/or other network devices or nodes). Additionally and/or alternatively, communication with other network nodes may also be performed using the transceivers 1110a-n and/or the respective antennas 1116a-n.

The node 1100 may also include other components that may be used with embodiments described herein. For example, the node 1100 may include, in some embodiments, a controller 1130 (which may be similar to the processor 1010 of FIG. 10) to manage communications with other nodes (e.g., sending and receiving messages) and to provide other related functionality. For example, the controller 1130 may be configured to control the operation of the antennas 1116a-n so as to adjustably control the antennas' transmission power and phase, gain pattern, antenna direction (e.g., the direction at which a resultant radiation beam from the antennas 1116a-n propagates), antenna diversity, and other adjustable antenna parameters for the antennas 1116a-n of the node 1100. In some embodiments, the antennas' configuration may be controlled according to pre-stored configuration data provided at the time of manufacture or deployment of the node 1100, or according to data obtained from a remote device (such as a central server sending data representative of the antenna configuration, and other operational parameters, that are to be used for the node 1100).

In some embodiments, the node 1100 may also be configured (e.g., through operations performed on the controller 1130) to receive an indication of an emergency condition at a device, determine if the device in question should be tracked, and transmit a triggering message to the device to trigger a tracking session if it is determined that the device should be tracked. In some implementations, the node 1100 may be configured to receive from a device (e.g., a personal mobile device) a request to establish a tracking session, to send a reply to the device to establish the tracking session, and to periodically receive from the device tracking session data collected during the tracking session by the device.

In addition, the node 1100 may include, in some embodiments, neighbor relations controllers (e.g., neighbor discovery modules) 1140 to manage neighbor relations (e.g., maintaining a neighbor list 1142) and to provide other related functionality. The controller 1130 may be implemented, in some embodiments, as a processor-based device, with a configuration and functionality similar to that shown and described in relation to FIG. 12. In some embodiments, the node may also include one or more sensors (not shown), such as any of the one or more sensors 1012 of the wireless device 1000 depicted in FIG. 10.

Figure 12:
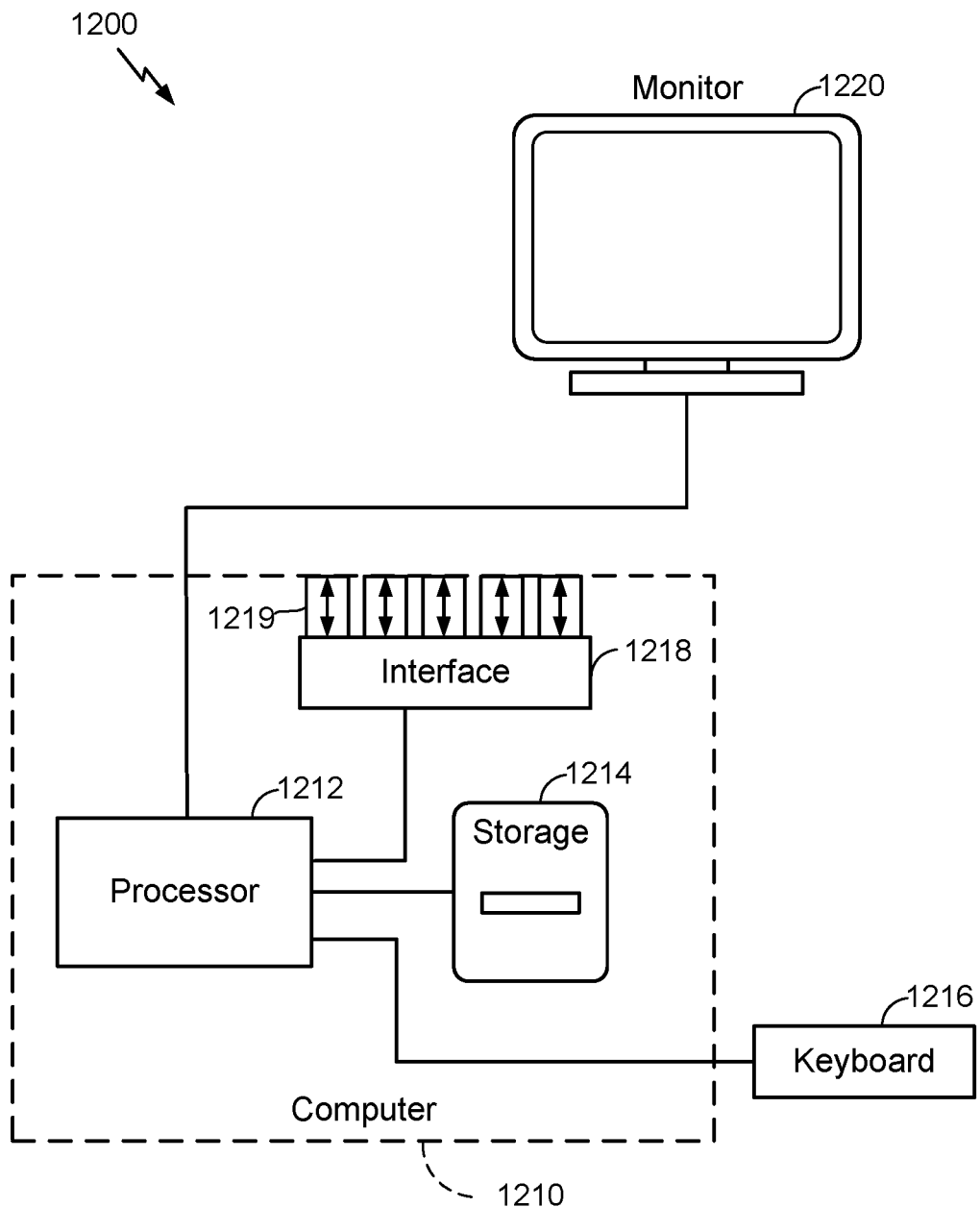
FIG. 12 is a schematic diagram of an example computing system.

Performing the procedures described herein may also be facilitated by a processor-based computing system. With reference to FIG. 12, a schematic diagram of an example computing system 1200 is shown. The computing system 1200 may be housed in, for example, a device such as the devices 108, 302, 702, 802, 902, and 1000 of FIGS. 1, 3, and 7-10, and/or may comprise at least part of, or all of, wireless devices, servers, nodes, access points, or base stations, such as the nodes 104a-b, 106a-c, 120, 122, 304, 306, 704, 706, 804, 806, 904, 906, and 1100 depicted in FIGS. 1, 3, 7-9, and 11. The computing system 1200 includes a computing-based device 1210 such as a personal computer, a specialized computing device, a controller, and so forth, that typically includes a central processor unit (CPU) 1212. In addition to the CPU 1212, the system includes main memory, cache memory and bus interface circuits (not shown). The computing-based device 1210 may include a mass storage device 1214, such as a hard drive and/or a flash drive associated with the computer system. The computing system 1200 may further include a keyboard, or keypad, 1216, and a monitor 1220, e.g., a CRT (cathode ray tube), LCD (liquid crystal display) monitor, etc., that may be placed where a user can access them (e.g., a mobile device's screen).

The computing-based device 1210 is configured to facilitate, for example, the implementation of one or more of the procedures described herein, including procedures to: a) receive a triggering message to trigger a tracking session, establish a tracking session (separate form an emergency call session), and send to one or more servers the tracking session data collected during the tracking session, b) receive an indication of an emergency condition at a device, determine if the device in question should be tracked, and transmit a triggering message to the device to trigger a tracking session if it is determined that the device should be tracked, and c) receive from a device (e.g., a mobile device) a request to establish a tracking session, send a reply to the device to establish the tracking session, and periodically receive from the device tracking session data collected during the tracking session by the device. The mass storage device 1214 may thus include a computer program product that, when executed on the computing-based device 1210, causes the computing-based device to perform operations to facilitate the implementation of the procedures described herein, as well as procedures to control the general functionality of the computing-based device 1210, and procedures to implement other applications and operations.

The computing-based device may further include peripheral devices to enable input/output functionality. Such peripheral devices may include, for example, a CD-ROM drive and/or flash drive, or a network connection, for downloading related content to the connected system. Such peripheral devices may also be used for downloading software containing computer instructions to enable general operation of the respective system/device. For example, as illustrated in FIG. 12, the computing-based device 1210 may include an interface 1218 with one or more interfacing circuits (e.g., a wireless port that includes transceiver circuitry, a network port with circuitry to interface with one or more network devices, etc.) to provide/implement communication with remote devices (e.g., so that a wireless device, such as any of the wireless devices or nodes depicted in any of the figures, could communicate, via a port, such as the port 1219, with another device or node). Alternatively and/or additionally, in some embodiments, special purpose logic circuitry, e.g., an FPGA (field programmable gate array), a DSP processor, an ASIC (application-specific integrated circuit), or other types of circuit-based and hardware arrangements may be used in the implementation of the computing system 1200. Other modules that may be included with the computing-based device 1210 are speakers, a sound card, a pointing device, e.g., a mouse or a trackball, by which the user can provide input to the computing system 1200. The computing-based device 1210 may include an operating system (e.g., an operating system to operate a mobile device).

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Memory may be implemented within the computing-based device 1210 or external to the device. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically (e.g., with lasers). Combinations of the above should also be included within the scope of computer-readable media.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device or station (MS) may refer to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device" or "wireless device") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station." A mobile device may also be referred to as a mobile terminal, a terminal, a user equipment (UE), a device, a Secure User Plane Location Enabled Terminal (SET), a target device, a target, or by some other name.

While some of the techniques, processes, and/or implementations presented herein may comply with all or part of one or more standards, such techniques, processes, and/or implementations may not, in some embodiments, comply with part or all of such one or more standards.

The detailed description set forth above in connection with the appended drawings is provided to enable a person skilled in the art to make or use the disclosure. It is contemplated that various substitutions, alterations, and modifications may be made without departing from the spirit and scope of the disclosure. Throughout this disclosure the term "example" indicates an example or instance and does not imply or require any preference for the noted example. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments. Thus, the disclosure is not to be limited to the examples and designs described herein but is to be accorded the widest scope consistent with the principles and novel features disclosed herein.

Further Subject Matter/Embodiments of Interest

The following recitation is drawn to additional subject matter that may be of interest and which is also described in detail herein along with subject matter presented in the initial claims presently presented herein:

A1—A method comprising: receiving by at least one server, from a device, a request to establish a tracking session to periodically collect and send tracking session data to the at least one server relating to an emergency condition at the device, the request to establish the tracking session sent by the device in response to a triggering message from an emergency call server to trigger the tracking session, wherein the triggering message is transmitted from the emergency call server to the device during an emergency call session, separate from the tracking session, in response to an indication message of the emergency condition at the device transmitted to the emergency call server; sending by the at least one server a reply to the device to establish the tracking session; and periodically receiving by the at least one server, from the device, the tracking session data collected by the device during the tracking session.

A2—The method recited in subject matter example A1, wherein the device is configured to operate during the tracking session in a reduced-power tracking mode state in which power to sub-systems of the device not required for collecting and communicating the tracking session data associated with the device is reduced, and in which one or more sensor or communication sub-systems of the device, configured to collect and communicate the tracking session data, operate at least partially while the device is in the reduced-power tracking mode state.

A3—The method recited in subject matter example A1, wherein periodically receiving the tracking session data comprises: receiving the tracking session data at one or more time instances, subsequent to a first time instance, determined based, at least in part, on power level of a battery of the device.

A4—The method recited in subject matter example A3, wherein sending the reply to the device comprises: sending the reply with data indicating a maximum periodicity value used for determining the one or more time instances, subsequent to the first time instance, and with data representative of data parameters to include with the tracking session data sent by the device.

A5—The method recited in subject matter example A1, further comprising: determining a position of the device based, at least in part, on location-determination data included in the received tracking session data.

A6—The method recited in subject matter example A1, further comprising: processing the received tracking session data; and transmitting at least some of the processed data to one or more devices associated with one or more emergency service providers.

A7—The method recited in subject matter example A6, wherein processing the received tracking session data comprises: filtering the tracking session data, or aggregating raw data included in the tracking session data, or any combination thereof, wherein the raw data comprises vital signs of a user of the device, body position of the user derived based on orientation sensors secured to the user, or location data, or any combination thereof.

A8—The method recited in subject matter example A6, wherein transmitting the at least some of the processed data comprises: transmitting the processed data to emergency crews, or transmitting the processed data to one or more analysis systems, or any combination thereof, wherein the one or more analysis systems include a first system to derive emergency resolution success rate statistics, a second system to compute risk analysis associated with emergencies, or a third system to perform root cause analysis, or any combination thereof.

A9—The method recited in subject matter example A1, further comprising: modifying the tracking session to modify: types of data collected and transmitted to the at least one server by the device, times at which the tracking session data is sent, or identity of one or more other tracking servers with which the device is to communicate, or any combination thereof.

A10—The method recited in subject matter example A1, wherein the indication message of the emergency condition at the device transmitted to the emergency call server comprises: an initiating message from the device regarding the emergency condition, a reply message from the device responsive to a polling message from the emergency call server, or a reporting message from another device to report the emergency condition at the device.

B1—A server comprising: one or more processors; and a transceiver, coupled to the one or more processors, and configured to: receive, from a device, a request to establish a tracking session to periodically collect and send tracking session data to the at least one server relating to an emergency condition at the device, the request to establish the tracking session sent by the device in response to a triggering message from an emergency call server to trigger the tracking session, wherein the triggering message is transmitted from the emergency call server to the device during an emergency call session, separate from the tracking session, in response to an indication message of the emergency condition at the device transmitted to the emergency call server; send a reply to the device to establish the tracking session; and periodically receive, from the device, the tracking session data collected by the device during the tracking session.

C1—An apparatus comprising: means for receiving by at least one server, from a device, a request to establish a tracking session to periodically collect and send tracking session data to the at least one server relating to an emergency condition at the device, the request to establish the tracking session sent by the device in response to a triggering message from an emergency call server to trigger the tracking session, wherein the triggering message is transmitted from the emergency call server to the device during an emergency call session, separate from the tracking session, in response to an indication message of the emergency condition at the device transmitted to the emergency call server; means for sending by the at least one server a reply to the device to establish the tracking session; and means for periodically receiving by the at least one server, from the device, the tracking session data collected by the device during the tracking session.

D1—A non-transitory computer readable media programmed with instructions, executable on a processor, to: receive by at least one server, from a device, a request to establish a tracking session to periodically collect and send tracking session data to the at least one server relating to an emergency condition at the device, the request to establish the tracking session sent by the device in response to a triggering message from an emergency call server to trigger the tracking session, wherein the triggering message is transmitted from the emergency call server to the device during an emergency call session, separate from the tracking session, in response to an indication message of the emergency condition at the device transmitted to the emergency call server; send by the at least one server a reply to the device to establish the tracking session; and periodically receive by the at least one server, from the device, the tracking session data collected by the device during the tracking session.

Although particular embodiments have been disclosed herein in detail, this has been done by way of example for purposes of illustration only, and is not intended to be limiting with respect to the scope of the appended claims, which follow. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A location tracking method comprising:
   establishing an emergency call session between a device and an emergency call server;
   establishing a tracking session, separate from the emergency call session, between the device and one or more tracking servers, wherein continuance of the tracking session is independent of continuance of the emergency call session, wherein terminating the emergency call session will not terminate the tracking session;
   sending, in the tracking session by the device to the one or more tracking servers after termination of the emergency call session, location data determined by the device, the location data comprising a plurality of locations of the device; and
   terminating the emergency call session in response to receiving a request to establish the tracking session.

2. The method of claim 1, wherein the plurality of locations of the device comprise at least one location of the device determined before establishment of the tracking session.

3. The method of claim 1, wherein sending the location data comprises sending tracking session data collected by the device during the tracking session.

4. The method of claim 1, further comprising receiving, by the device from the emergency call server, a triggering message to trigger establishment of the tracking session, wherein establishing the tracking session is performed in response to receiving the triggering message.

5. The method of claim 1, wherein the tracking session is established in response to establishing the emergency call session.

6. The method of claim 1, wherein establishing the tracking session is performed in response to establishing the emergency call session.

7. The method of claim 1, wherein sending the plurality of locations of the device after termination of the emergency call session comprises periodically sending a present location of the device.

8. A mobile wireless communication device comprising:
   a transceiver; and
   a processor coupled to the transceiver and configured to:
      establish an emergency call session between the mobile wireless communication device and an emergency call server;
      establish a tracking session, separate from the emergency call session, between the mobile wireless communication device and one or more tracking servers, wherein continuance of the tracking session is independent of continuance of the emergency call session, wherein terminating the emergency call session will not terminate the tracking session;
      send, via the interface in the tracking session by the mobile wireless communication device to the one or more tracking servers after termination of the emergency call session, location data determined by the mobile wireless communication device, the location data comprising a plurality of locations of the mobile wireless communication device; and
      terminate the emergency call session in response to receiving a request to establish the tracking session.

9. The device of claim 8, wherein the plurality of locations of the mobile wireless communication device comprise at least one location of the mobile wireless communication device determined before establishment of the tracking session.

10. The device of claim 8, wherein the location data comprises tracking session data collected by the mobile wireless communication device during the tracking session.

11. The device of claim 8, wherein the processor is configured to establish the tracking session in response to receipt of a triggering message in the emergency call session.

12. The device of claim 8, wherein the processor is configured to establish the tracking session in response to establishment of the emergency call session.

13. A mobile wireless communication device comprising:
   means for establishing an emergency call session between the mobile wireless communication device and an emergency call server;
   means for establishing a tracking session, separate from the emergency call session, between the mobile wireless communication device and one or more tracking servers, wherein continuance of the tracking session is independent of continuance of the emergency call session, wherein terminating the emergency call session will not terminate the tracking session;
   means for sending, in the tracking session by the mobile wireless communication device to the one or more tracking servers after termination of the emergency call session, location data determined by the mobile wireless communication device, the location data comprising a plurality of locations of the mobile wireless communication device; and
   means for terminating the emergency call session in response to receiving a request to establish the tracking session.

14. The method of claim 13, wherein the plurality of locations of the mobile wireless communication device comprise at least one location of the mobile wireless communication device determined before establishment of the tracking session.

15. The method of claim 13, wherein the means for sending the location data are for sending tracking session data collected by the mobile wireless communication device during the tracking session.

16. The method of claim 13, further comprising means for receiving, by the mobile wireless communication device from the emergency call server, a triggering message to trigger establishment of the tracking session, wherein the means for establishing the tracking session are for establishing the tracking session in response to receipt of the triggering message.

17. The method of claim 13, wherein the means for establishing the tracking session are for establishing the tracking session in response to establishment of the emergency call session.

18. A non-transitory computer-readable medium programmed with instructions, executable on a processor of a mobile wireless communication device, to:
   establish an emergency call session between the mobile wireless communication device and an emergency call server;
   establish a tracking session, separate from the emergency call session, between the mobile wireless communication device and one or more tracking servers, wherein continuance of the tracking session is independent of continuance of the emergency call session, wherein terminating the emergency call session will not terminate the tracking session;
   send, in the tracking session by the mobile wireless communication device to the one or more tracking servers after termination of the emergency call session, location data determined by the mobile wireless communication device, the location data comprising a plurality of locations of the mobile wireless communication device; and
   terminate the emergency call session in response to receiving a request to establish the tracking session.

19. The computer-readable medium of claim 18, wherein the plurality of locations of the mobile wireless communication device comprise at least one location of the mobile wireless communication device determined before establishment of the tracking session.

20. The computer-readable medium of claim 18, wherein the instructions to send the location data comprise instructions to send tracking session data collected by the mobile wireless communication device during the tracking session.

21. The computer-readable medium of claim 18, wherein the instructions to establish the tracking session comprise instructions to establish the tracking session in response to receiving a triggering message in the emergency call session.

22. The computer-readable medium of claim 18, wherein the instructions to establish the tracking session comprise instructions to establish the tracking session in response to establishment of the emergency call session.

\* \* \* \* \*